United States Patent
Sekiya et al.

(10) Patent No.: US 8,081,331 B2
(45) Date of Patent: Dec. 20, 2011

(54) IMAGE FORMING APPARATUS

(75) Inventors: Takuro Sekiya, Kanagawa (JP); Koji Hirakura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1102 days.

(21) Appl. No.: 11/338,692

(22) Filed: Jan. 25, 2006

(65) Prior Publication Data

US 2006/0192992 A1 Aug. 31, 2006

(30) Foreign Application Priority Data

| Jan. 25, 2005 | (JP) | ................................ 2005-016303 |
| Mar. 18, 2005 | (JP) | ................................ 2005-078440 |
| Oct. 12, 2005 | (JP) | ................................ 2005-297655 |

(51) Int. Cl.
*G06F 15/00* (2006.01)
*G06F 3/12* (2006.01)
*G06K 1/00* (2006.01)
*G06K 15/00* (2006.01)

(52) U.S. Cl. ...................................... 358/1.15; 358/1.16
(58) Field of Classification Search .................. 358/1.15, 358/1.13, 1.14, 1.1, 1.16

See application file for complete search history.

(56) References Cited

U.S. PATENT DOCUMENTS

| 4,504,844 A | | 3/1985 | Ebi et al. |
| 4,510,509 A | | 4/1985 | Horike et al. |
| 4,631,553 A | | 12/1986 | Sekiya |
| 4,756,961 A | * | 7/1988 | Mouri et al. ................ 428/32.13 |
| 4,990,939 A | | 2/1991 | Sekiya et al. |
| 5,172,139 A | | 12/1992 | Sekiya et al. |
| 5,179,683 A | * | 1/1993 | Murakami et al. ............... 710/21 |
| 5,293,182 A | | 3/1994 | Sekiya et al. |
| 5,389,962 A | | 2/1995 | Sekiya et al. |
| 5,412,413 A | | 5/1995 | Sekiya et al. |
| 5,420,618 A | | 5/1995 | Sekiya et al. |
| 5,508,785 A | * | 4/1996 | Takahashi et al. ............ 399/130 |
| 5,600,356 A | | 2/1997 | Sekiya et al. |
| 5,610,637 A | | 3/1997 | Sekiya et al. |
| 5,657,060 A | | 8/1997 | Sekiya et al. |
| 5,729,257 A | | 3/1998 | Sekiya et al. |
| 5,740,445 A | * | 4/1998 | Okuda .......................... 707/102 |
| 5,754,202 A | | 5/1998 | Sekiya et al. |
| 5,828,780 A | * | 10/1998 | Suzuki et al. .................. 382/167 |

(Continued)

FOREIGN PATENT DOCUMENTS

JP 07-29173 A 1/1995

(Continued)

OTHER PUBLICATIONS

U.S. Appl. No. 06/399,004, filed Jul. 16, 2982, Takuro Sekiya.

(Continued)

*Primary Examiner* — Douglas Tran
(74) *Attorney, Agent, or Firm* — Oblon, Spivak, McClelland, Maier & Neustadt, L.L.P.

(57) ABSTRACT

An image forming apparatus includes an input part for inputting information, a processing part for processing the information; a storing part for storing the information, an output part for outputting the information, a writing part for writing desired information to a portable recording medium, and a scanner for scanning an original as image information. In image forming apparatus, the image information scanned by the scanner is stored in the storing part, and wherein the input part, the processing part, the storing part, and the output part are centralized at one place, and send and receive the information to and from each other.

12 Claims, 21 Drawing Sheets

U.S. PATENT DOCUMENTS

| | | | | |
|---|---|---|---|---|
| 5,839,046 A * | | 11/1998 | Takano et al. | 399/384 |
| 5,877,786 A | | 3/1999 | Sekiya et al. | |
| 5,910,387 A * | | 6/1999 | Mychajlowskij et al. | 430/109.31 |
| 5,949,688 A | | 9/1999 | Montoya et al. | 700/235 |
| 6,039,425 A | | 3/2000 | Sekiya et al. | |
| 6,055,067 A * | | 4/2000 | Matsuda et al. | 358/468 |
| 6,193,348 B1 | | 2/2001 | Sekiya et al. | |
| 6,227,639 B1 | | 5/2001 | Sekiya et al. | |
| 6,338,545 B1 | | 1/2002 | Sekiya | |
| 6,409,401 B1 * | | 6/2002 | Petteruti et al. | 400/88 |
| 6,416,874 B1 * | | 7/2002 | McAneney et al. | 428/480 |
| 6,554,401 B2 | | 4/2003 | Sekiya | |
| 6,568,778 B1 | | 5/2003 | Sekiya et al. | |
| 6,598,959 B2 | | 7/2003 | Sekiya | |
| 6,648,533 B2 * | | 11/2003 | Lo et al. | 400/621 |
| 6,764,174 B2 | | 7/2004 | Sekiya | |
| 6,789,866 B2 | | 9/2004 | Sekiya et al. | |
| 6,801,750 B2 * | | 10/2004 | Kawahira | 399/407 |
| 6,871,940 B2 | | 3/2005 | Sekiya | |
| 6,871,946 B2 * | | 3/2005 | Yanagi et al. | 347/101 |
| 6,918,666 B2 | | 7/2005 | Sekiya | |
| 6,975,663 B2 | | 12/2005 | Sekiya et al. | |
| 2001/0024227 A1 | | 9/2001 | Sekiya | |
| 2002/0122098 A1 | | 9/2002 | Sekiya | |
| 2002/0136564 A1 * | | 9/2002 | Takamine et al. | 399/82 |
| 2002/0145614 A1 * | | 10/2002 | Van Valer | 345/629 |
| 2003/0036425 A1 * | | 2/2003 | Kaminkow et al. | 463/25 |
| 2003/0058301 A1 | | 3/2003 | Sekiya | |
| 2003/0085948 A1 | | 5/2003 | Sekiya | |
| 2003/0160995 A1 * | | 8/2003 | Oka et al. | 358/1.15 |
| 2003/0179263 A1 | | 9/2003 | Sekiya | |
| 2003/0222928 A1 * | | 12/2003 | Cummins et al. | 347/2 |
| 2004/0001418 A1 | | 1/2004 | Shinotsuka et al. | |
| 2004/0021904 A1 * | | 2/2004 | Skurdal et al. | 358/1.16 |
| 2004/0135846 A1 | | 7/2004 | Sekiya | |
| 2004/0150320 A1 | | 8/2004 | Sekiya | |
| 2004/0188283 A1 * | | 9/2004 | Andersen | 206/232 |
| 2004/0196330 A1 | | 10/2004 | Sekiya | |
| 2004/0201648 A1 | | 10/2004 | Sekiya | |
| 2004/0213611 A1 * | | 10/2004 | Weast | 400/61 |
| 2004/0239709 A1 | | 12/2004 | Sekiya et al. | |
| 2004/0246325 A1 | | 12/2004 | Sekiya | |
| 2005/0006258 A1 * | | 1/2005 | O'Bryan | 206/232 |
| 2005/0012956 A1 * | | 1/2005 | Castle | 358/1.15 |
| 2005/0024689 A1 * | | 2/2005 | House et al. | 358/426.05 |
| 2005/0088487 A1 | | 4/2005 | Sekiya | |
| 2005/0105943 A1 * | | 5/2005 | Park et al. | 399/405 |
| 2005/0116034 A1 * | | 6/2005 | Satake et al. | 235/432 |
| 2005/0128086 A1 * | | 6/2005 | Brown et al. | 340/572.8 |
| 2005/0138428 A1 * | | 6/2005 | McAllen et al. | 713/201 |
| 2005/0140709 A1 | | 6/2005 | Sekiya | |
| 2005/0147743 A1 | | 7/2005 | Sekiya | |
| 2005/0224083 A1 * | | 10/2005 | Crass et al. | 128/897 |
| 2005/0248459 A1 * | | 11/2005 | Bonalle et al. | 340/572.8 |
| 2006/0015752 A1 * | | 1/2006 | Krueger | 713/193 |
| 2006/0026205 A1 * | | 2/2006 | Butterfield | 707/104.1 |
| 2006/0044949 A1 * | | 3/2006 | Ferlitsch | 369/30.01 |
| 2006/0109130 A1 * | | 5/2006 | Hattick et al. | 340/572.7 |
| 2006/0121694 A1 * | | 6/2006 | Tamura | 438/458 |
| 2006/0125637 A1 * | | 6/2006 | Hirai et al. | 340/572.3 |
| 2006/0134318 A1 * | | 6/2006 | Hudd et al. | 427/98.4 |
| 2006/0145858 A1 * | | 7/2006 | Rathbun et al. | 340/572.4 |
| 2006/0158693 A1 * | | 7/2006 | Takahashi et al. | 358/3.03 |
| 2006/0181716 A1 * | | 8/2006 | Hoshina | 358/1.1 |
| 2006/0244597 A1 * | | 11/2006 | Tethrake et al. | 340/572.1 |
| 2006/0265644 A1 * | | 11/2006 | Koizumi | 715/522 |
| 2006/0290513 A1 * | | 12/2006 | Shanton | 340/572.7 |
| 2007/0035466 A1 * | | 2/2007 | Coleman et al. | 343/895 |
| 2007/0194135 A1 * | | 8/2007 | Inoue et al. | 235/492 |
| 2008/0087990 A1 * | | 4/2008 | Kato et al. | 257/664 |
| 2008/0247001 A1 * | | 10/2008 | Maki et al. | 358/3.26 |

FOREIGN PATENT DOCUMENTS

| | | |
|---|---|---|
| JP | 8-160554 A | 6/1996 |
| JP | 2002-27192 | 1/2002 |
| JP | 2003-123042 A | 4/2003 |
| JP | 3475188 | 9/2003 |
| JP | 2003-337682 | 11/2003 |
| JP | 2004-223920 A | 8/2004 |

OTHER PUBLICATIONS

U.S. Appl. No. 07/557,565, filed Jul. 24, 1990, Takuro Sekiya.
U.S. Appl. No. 07/888,452, filed May 20, 1992, Takuro Sekiya.
U.S. Appl. No. 08/182,374, filed Jan. 14, 1994, Takuro Sekiya.
U.S. Appl. No. 07/630,321, filed Dec. 19, 1990, Takuro Sekiya.
U.S. Appl. No. 07/915,325, filed Jul. 16, 1992, Takuro Sekiya.
U.S. Appl. No. 08/253,426, filed Jun. 2, 1994, Takuro Sekiya.
U.S. Appl. No. 07/880,163, filed May 5, 1992.
U.S. Appl. No. 08/174,425, filed Dec. 28, 1993.
U.S. Appl. No. 08/162,650, filed Dec. 6, 1993, Takuro Sekiya.
U.S. Appl. No. 08/547,904, filed Oct. 25, 1995, Takuro Sekiya.
U.S. Appl. No. 10/697,035, filed Oct. 31, 2003, Naoto Jikutani, et al.
Office Action issued Jan. 11, 2011, in Japanese Patent Application No. 2005-297655.

* cited by examiner

IMAGE FORMING APPARATUS

BACKGROUND OF THE INVENTION

1. Field of the Invention

The present invention generally relates to an image forming apparatus, and more particularly to the image forming apparatus capable of using a paper media as an output medium of information and including an outputting part for outputting other information and another medium.

2. Description of the Related Art

Recently, since a copier has been improved to process digitalized information, the copier is being evolved as a digital copier, an MFP (Multi-Function Printer, or Multi-Function Peripheral), or a like, which includes a scanner function, a fax function, a printer function, and a like in addition to a function performing as a copier (for example, refer to Japanese Laid-open Patent Application No. 2002-202870). Upon the technology evolution of the copier, the digital copier and the MFP are introduced as network machines in a computer network. As a result, information processed in network machines is passed through the computer network as digital data. Moreover, the copier has improved to include a filing function for storing a large amount of document data with characteristics of the electronic data as described above (for example, refer to Japanese Laid-open Patent No. 2002-027192).

By evolutions of computers or network systems, any data can be utilized as electronic data. On the other hand, since conventional paper documents are easily read and have a pleasant feel, a demand of the paper documents has not been reduced. Moreover, in this current technical era, data are generally sent and received through a network. For example, in the MFP, information read by a scanner can not only be output on a paper sheet but also be received by electric mail (for example, refer to Japanese Laid-open Application No. 2003-337682).

Disadvantageously, in the network, information to be sent and received is invisibly delivered, and it is ambiguous as to whether or not the information is surely delivered to a right destination.

SUMMARY OF THE INVENTION

It is a general object of the present invention to provide an image forming apparatus in which the above-mentioned problems are eliminated.

A more specific object of the present invention is to provide the image forming apparatus in which an inputting part, a processing part, a storing part, and an outputting part for information are centralized at one place and the information can be exchanged among those parts, so as to be user-friendly.

The above objects of the present invention are achieved by an image forming apparatus, including: an input part for inputting information; a processing part for processing the information; a storing part for storing the information; an output part for outputting the information; a writing part for writing desired information to a portable recording medium; and a scanner for scanning an original as image information, wherein the output part applies the color materials to a sheet-shaped member, wherein the image information scanned by the scanner is stored in the storing part, and wherein the input part, the processing part, the storing part, and the output part are centralized at one place, and send and receive the information to and from each other.

According to the present invention, it is possible to improve a configuration of the image forming apparatus to be a user-friendly for a user.

For example, it is possible to output information to the sheet-shaped member represented by a paper medium, and also it is possible to output data contents of the sheet-shaped member to the portable recording medium other than the sheet-shaped member. Therefore, it is possible to maintain and move electronic data.

Moreover, since the input part, the processing part, the storing part, and the output part are centralized at one place, the paper medium and the portable recording medium can be obtained at the same place. Therefore, it is possible to improve a configuration of the image forming apparatus to be a user-friendly for a user.

Furthermore, since the image information scanned by the scanner is stored in the storing part, instead of immediately output the image information, it is possible to maintain the image information inside the MFP and to retrieve the image information at any time if necessary.

BRIEF DESCRIPTION OF THE DRAWINGS

In the following, embodiments of the present invention will be described with reference to the accompanying drawings.

DESCRIPTION OF THE PREFERRED EMBODIMENTS

In the following, embodiments of the present invention will be described with reference to the accompanying drawings.

In the embodiments, a color image forming apparatus will be described as an example of an MFP (Multi-Function Printer or Multi-Function Peripheral) which realizes a system according to the present invention. It should be noted that the embodiment in the following are examples and the present invention is not be limited to the image forming apparatus described in the embodiments.

Figure 1:
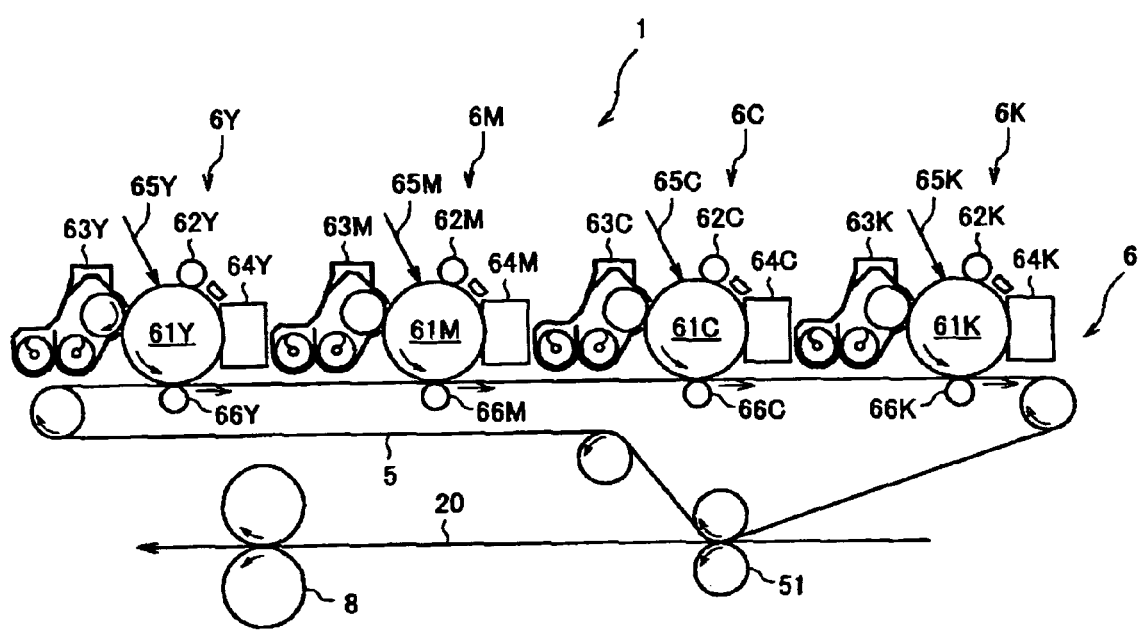
FIG. 1 is a diagram showing an image formation part of a full-color imaging apparatus of a dry type two component developer method in which photoreceptor drums as a latent image carrier are arrange in a tandem array, according to an embodiment of the present invention.
Figure 2:
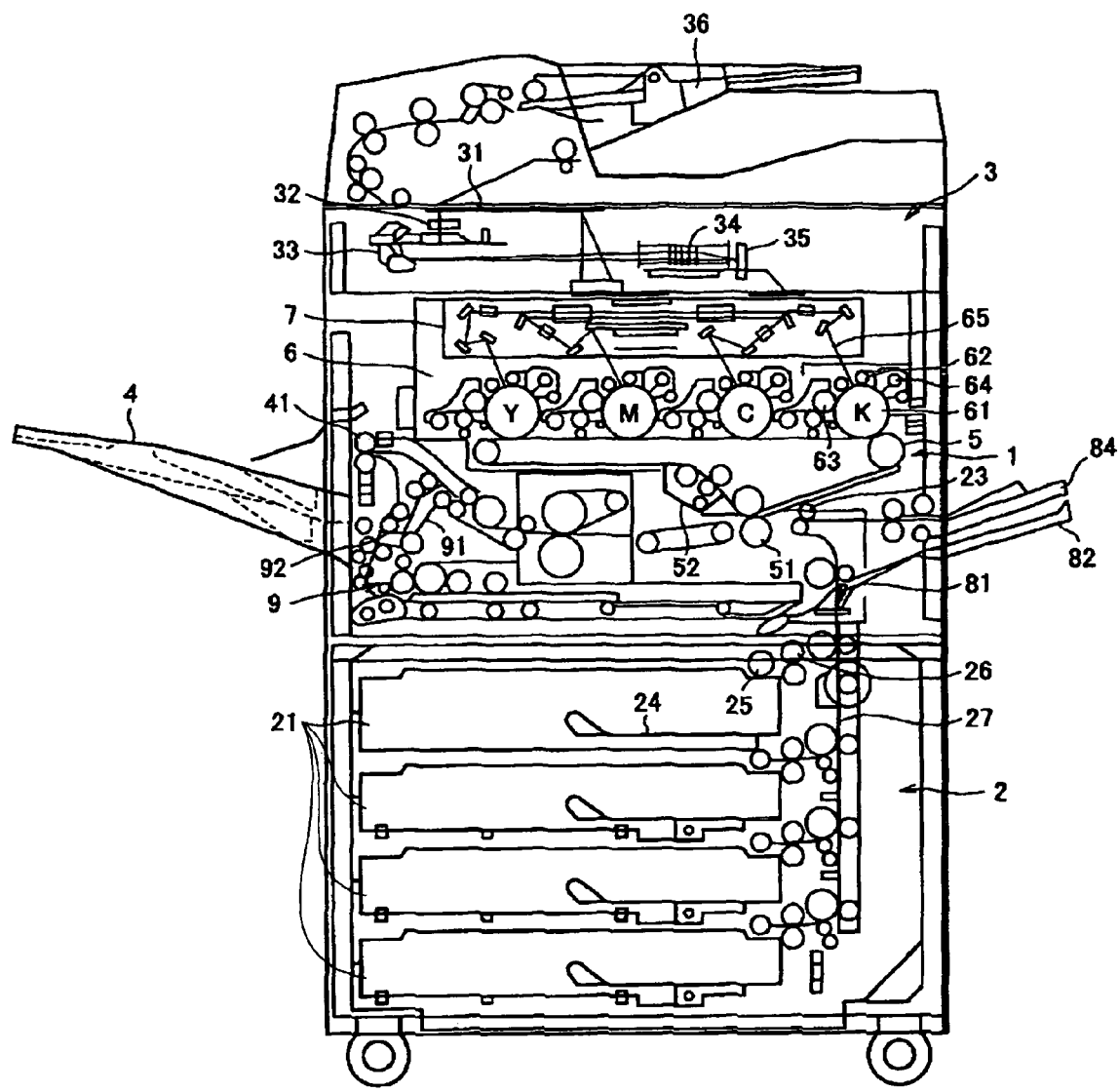
FIG. 2 is a diagram showing the entire full-color imaging apparatus of the dry type two component developer method in which the photoreceptor drums as a latent image carrier are arrange in the tandem array, according to the embodiment of the present invention.

In FIG. 1 and FIG. 2, an electronograph copier is shown as a representative example in which a color material is applied on a sheet member, as which a paper sheet is representative to be preferably applied in an image forming system (can be called an image input/output system) according to the present invention. Alternatively, an OHP (Over Head Projector) sheet such as a resin film can be preferably used.

FIG. 1 shows an engine part (image forming part) of an electronograph principle (Carlson process). In this example, an image forming part of a full-color imaging apparatus of a dry type two-component developing system, in which photoreceptor drums as latent image carriers are arranged in a tandem array, is shown as the engine part.

FIG. 2 is a diagram showing the entire mechanism of the full-color imaging apparatus arranging the photoreceptor drums in the tandem array. In FIG. 2, an image formation part 1 is arranged approximately at a center of the color image forming apparatus MFP (Multi-Function Printer, or Multi-Function Peripheral) of a quadruple tandem type, paper feeding parts 2 are arranged immediately under the image formation part 1, and paper feed trays 21 are provided at the paper feeding parts 2. A reading part 3 is arranged above the image formation part 1. A sheet ejection tray 4 for accommodating ejected sheets is arranged at a downstream side in a sheet conveyance direction, so that a recording sheet, in which an image is formed and which is ejected, is accumulated in the sheet ejection tray 4.

In the image formation part 1, as shown in FIG. 1, a plurality of imaging parts 6 (6Y, 6M, 6C, and 6K) for yellow (Y), magenta (M), cyan (C), and black (K) are aligned above an intermediate transfer belt 5 having a continuous belt. In FIG. 1, suffixes Y, M, C, and K are added to numerals, so that each of the plurality of imaging parts 6 is distinguishable for each color. Similarly, photoreceptor drums 61, charging devices 62, developing devices 63, cleaning devices 64 of the photoreceptor drums 61, and exposed parts 65 shown in FIG. 2 are shown with suffixes Y, M, C, and K corresponding to colors Y, M, C, and K. In the imaging parts 6Y, 6M, 6C, and 6K, along a circumference of photoreceptor drums 61Y, 61M, 61C, and 61K arranged corresponding to colors, charging devices 62Y, 62M, 62C, and 62K, exposed parts 65Y, 65M, 65C, and 65K, developing devices 63Y, 63M, 63C, and 63K, and cleaning devices 64Y, 64M, 64C, and 64K of the photoreceptor drums 61Y, 61M, 61C, and 61K are arranged. The photoreceptor drums 61Y, 61M, 61C, and 61K conduct a charging process on surfaces of the photoreceptor drums 61Y, 61M, 61C, and 61K. The exposed parts 65Y, 65M, 65C, and 65K are exposed by laser beams illuminated from the image exposure device 7 which illuminates the laser beams on surfaces of the photoreceptor drums 61Y, 61M, 61C, and 61K to form image information. The developing devices 63Y, 63M, 63C, and 63K visualize electrostatic latent images exposed and formed on the surfaces of the photoreceptor drums 61Y, 61M, 61C, and 61K, by toner developments. The cleaning devices 64Y, 64M, 64C, and 64K eliminate and collect residual toners on the surfaces of the photoreceptor drums 61Y, 61M, 61C, and 61K after images are transferred to individual sheets.

As an imaging process, images corresponding to colors are formed on the intermediate transfer belt 5 so that four images corresponding to four colors are overlaid to form a single color image on the intermediate transfer belt 5. In this case, first, the imaging part 61Y for yellow (Y) develops a yellow image by a yellow toner, and the yellow image is transferred to the intermediate transfer belt 5 by a primary transferring device 66Y. Next, the imaging part 61M for magenta (M) develops a magenta image by a magenta toner, and the magenta image is transferred to the intermediate transfer belt 5 by a primary transferring device 66M. Next, the imaging part 61C for cyan (C) develops a cyan image by a cyan toner, and the cyan image is transferred to the intermediate transfer belt 5 by a primary transferring device 66C. Finally, the imaging part 61B for black (K) develops a black image by a black toner, and the black image is transferred to the intermediate transfer belt 5 by a primary transferring device 66K. Accordingly, four color images are overlaid and a toner image of full color is formed. A toner image of four colors transferred on the intermediate transfer belt 5 is transferred to a recording sheet 20 supplied from one of the paper feeding parts 2 by a secondary transferring device 51. After the toner image is fixed by a fixing device 8, the sheet is ejected to a sheet ejection tray 4 by a paper ejecting roller 41, or the sheet is conveyed to a double-sided device 9.

In a case of a double sided print, a conveyance path is branched at a branch part 91, and the recording sheet 20 is reversed through the double-sided device 9. Then, a skew of the recording sheet 20 is corrected by a resist roller 23, and an image formation operation is conducted to a back side of the recording sheet 20 in the same manner with respect to a front side of the recording sheet 20. On the other hand, after the toner image of the full color is transferred, the toner residues on the surface of the intermediate transfer belt 5 are removed and collected by the cleaning device 52 of the intermediate transfer belt 5. A feeding path 92 is a reverse paper feeding path from the double-sided device 9.

In the paper feeding parts 2, a plurality of the recording sheets 20, which have not been used, are accommodated in any one of the paper feed trays 21. Until a position at which an edge of the most upper recording sheet 20 in the paper feed tray 21 contacts to a pickup roller 25, an edge of a bottom plate 24 movably supported at a bottom of the paper feed tray 21 is lifted. When a paper feed roller 26 rotates, the most upper recording sheet 20 is pulled out from the paper feed tray 21 by a pickup roller 25, and is conveyed to the resist roller 23 through a vertical carrying path 27 by the paper feed roller 26. The resist roller 23 temporarily stops conveying the recording sheet 20, and sends out the recording sheet 20 at proper timing so that the toner image on the intermediate transfer belt 5 and a position of a front end of the recording sheet 20 are positioned at a predetermined relationship thereof. In addition to the recording sheet 20 conveyed from the vertical carrying path 27, the resist roller 23 similarly functions with respect to the recording sheet 20 conveyed from a manual feed tray 84. It should be noted that in FIG. 2, a branch claw 81 and a jammed sheet ejection tray 82 are shown, and the branch claw 81 operates a function for leading the recording sheet 20 toward the jammed sheet ejection tray 82 when the recording sheet 20 is jammed at a downstream side of the vertical carrying path 27.

In the image forming apparatus according to the present invention, a plurality of the recording sheets 20 are stocked in the paper feed tray 21 so as to successively record (print out) to one or more recording sheets 20. Thus, it is possible to release a user from bringing and setting each of the recording sheets 20 to the image forming apparatus.

Moreover, in the image forming apparatus, a stock amount or a residual amount of the recording sheets 20 can be detected for each of the paper feed trays 21. For example, in a middle of the vertical carrying path 27 until the recording sheet 20 is conveyed from one of the paper feed trays 21 to the intermediate transfer belt 5, a means may be arranged to switch ON or OFF by a physical contact of the recording sheet 20. Alternatively, a light emitting element and a light receiving element may be arranged in a state of clamping the recording sheet 20, so that a passage of the recording sheet 20 can be detected. That is, when the recording sheet 20 has not passed in a certain time, it can be detected that no recording sheet 20 remains in the specific paper feed tray 21 (zero residual amount).

Also, it is important to provide information indicating that a stock of the recording sheets 20 becomes low soon, before the stock of the recording sheets 20 is completely empty. In this case, a thickness (height) of the plurality of the recording sheets 20 being stocked in each of the paper feed trays 21 may be physically measured. For example, a contact element may be provided to contact with the plurality of recording sheets 20 being stocked in the specified paper feed tray 21 and move accompanying with the thickness (height) of the plurality of the recording sheets 20. A move amount can be detected by an electromagnetic coil, and a displacement can be converted into an electrical signal. Accordingly, the residual amount of the recording sheets 20 can be detected. Alternatively, a light emitting element and a light receiving element are arranged in a state of clamping the plurality of the recording sheets 20 accumulated in the specified paper feed tray 21, so that the thickness (height) of the plurality of the recording sheets 20 can be detected. The thickness (height) can be detected and indicated with strength or weakness of an optical signal. Similarly, it is possible to detect the residual amount of the recording sheets 20.

As described above, a low volume of the recording sheets 20 (zero residual amount) or a state of soon to be a shortage is detected. With respect to sheet shortage detection, in a conventional copier, a signal indicating a necessity of supplying the recording sheets 20 is simply emitted. However, in the present invention, the sheet shortage detection is more meaningful than an emission of the signal indicating the necessity of supplying the recording sheets 20, and will be described later in detail.

In order to scan an original put on a contact glass 31, in the reading part 3, a first traveling body 32 and a second traveling body 33 mounting light sources for illuminating the original move laterally backwards and forwards. Image information scanned by the first traveling body 31 and the second traveling body 33 are condensed to an imaging surface of a CCD (Charge Coupled Device) 35 arranged at the rear, by a lens 34. Then, the image information is read as an image signal by the CCD 35. The image signal read by the CCD 35 is digitized and an image process is conducted to the image signal.

It should be noted that in the present invention, as a read density (resolution), any one of 300 dpi, 600 dpi, 1200 dpi can be applied to scan and the read density is selectable, if necessary. Moreover, after the image information is filtered by three primary color filters of red (R), green (G), and blue (B), the image information is read as the image signal by the CCD 35, and the image signal is read as color image data.

The color image data are temporarily stored in a memory of the MFP. In this case, the color image data may be stored as bitmap data as it is read. Alternatively, the color image data may be stored as data (JPEG data) which is compressed approximately within 1/10 through 1/100 an original amount by JPEG. As describe later, if necessary, the color image data are used as print data in an electrograph principle, an inkjet principle, or a like, or is used as storage data for a portable recording medium. The color image data are further distributed by electric mail to another information processing apparatus or a like through a network. In a case of storing the color image data within the MFP for a longtime, or in a case of a network distribution, the color image data are compressed and stored, or are distributed. Accordingly, it is possible to reduce workload of a memory of the MFP itself, workload of a network server, workload of a line, and a like. In addition, it is possible to improve a transmission speed of sending and receiving data in the MFP and in an external network.

Next, based on an image process signal, the color image data are used to optically write on surfaces of the photoreceptor drums 61Y, 61M, 61C, and 61K by emission of a laser diode (LD) (not shown) within the image exposure device 7, and electrostatic latent images are formed on the surfaces of the photoreceptor drums 61Y, 61M, 61C, and 61K. An optical signal from the laser diode (LD) reaches each of the photoreceptor drums 61Y, 61M, 61C, and 61K. Also, an auto document feeder (ADF) 36 is mounted at an upper portion of the reading part 3 to automatically convey the original on the contact glass 31.

Figure 3:
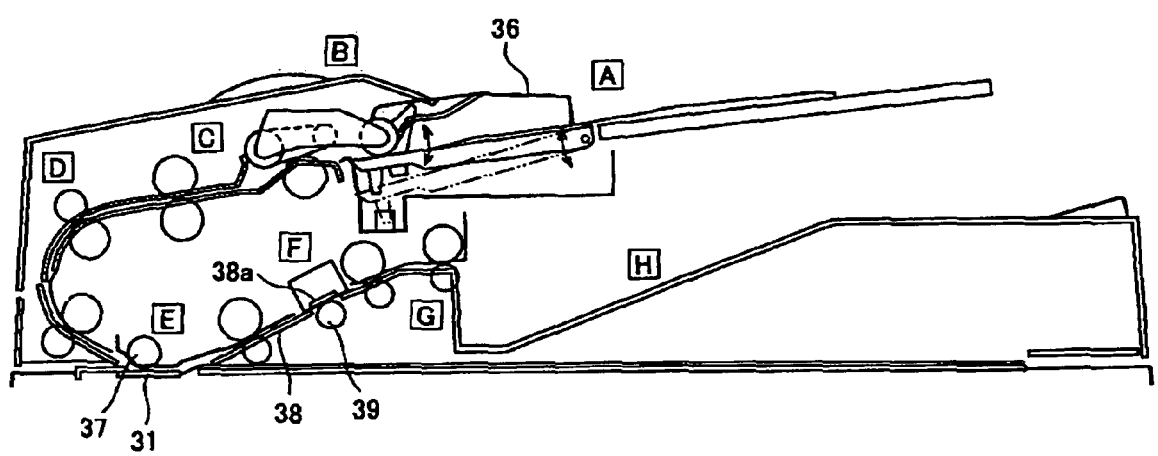
FIG. 3 is a diagram showing a configuration of an automatic document feeder applied to the full-color imaging apparatus according to the embodiment of the present invention.

The auto document feeder (ADF) 36 will be described with reference to FIG. 3. The original is conveyed for every one sheet by the auto document feeder (ADF) 36. The auto document feeder (ADF) 36 is a sheet through type which scans an original image in a process passing through a surface of a reading means. In the present invention, the auto document feeder (ADF) 36 is provided with reading means arranged at two places along with an original conveyance path so as to scan original image information of both sides at once in a single process conveying the original.

In the present invention, the auto document feeder (ADF) 36 includes a document setting part A for setting a sheet bundle of the original subject to be scanned, a separating and feeding part B for separating and feeding the original for every one sheet from the sheet bundle being set at the document setting part A, a resist part C for arranging the sheet by letting the sheet hit once and pulling the sheet being arranged, a turn part D for turning and conveying the sheet being conveyed to direct toward a reading side (downward), a first reading conveyance part (first reading position) E for a front image of the sheet to be scanned from down below the contact glass 31, a second reading conveyance part (first reading position) F for a back image of the sheet to be read after the front image is read, a sheet ejection part G for ejecting the sheet outside after both sides of the sheet are completely scanned, a stacking part H for accumulating and storing the sheets of the original after the sheets are scanned, a driving part for driving a conveyance operation, and a controller part for controlling a series of operations of the auto document feeder (ADF) 36.

In the first reading conveyance part E, the contact glass 31, a reading roller 37, and a reading part (first reading means) stopping immediately under the contact glass 31 are arranged. The first reading means reads an image of the front surface of the sheet of the original.

In the second reading conveyance part F, a reading part (second reading means) 38 mounting a CCD, and a reading roller 39 are arranged. The second reading part 38 reads the back surface of the sheet of the original. The reading roller 39 is arranged so that the reading roller 39 faces to a reading surface 38a of the reading means 38 in a non-contact state.

In the present invention, a plurality of sheets of the original can be effectively and sequentially conveyed and image data can be read. The present invention is also preferably used for only one sheet. In a case of reading the original, it is possible to read the front side and the back side of each of sheets of the original. It is possible to read one side only and both sides depending on a type of the original. In general, the one side is read by the first reading conveyance part (first reading position) E. In a case of a double sided original, the second reading conveyance part (second reading position) F reads a reverse side by using the second reading part 38, so as to read the both sides of the original.

In this embodiment, as described above, in addition to a function as a digital color copier in that the MFP reads the original by the optical scan, digitizes the color image data read from the original, and copies to the recording sheet, for example, the MFP stores the color image data in an internal memory, conducts a facsimile function for remotely sending and receiving the color image data of the original by a control unit (not shown), and a print function for printing out the color image data processed by a computer to the recording sheet. The MFP according to the present invention is a multi-functional image forming apparatus.

In this case, as a single apparatus, the MFP includes various functions as described above. As described later, under a server management connected to a network, the above described various functions can be realized by a system conducting a cooperative operation among other various apparatuses (a scanner, various printers, an optical disk drive, a hard disk drive, and a like). Alternatively, the MFP itself can be provided with a network server function. In addition to the print function, the scanner function, the facsimile function, the data storage function, the data editing function, the electric mail distribution function, and a like, as described above, the MFP includes the network server function, so as to configure a single information input/output apparatus (centralizing various functions at one place).

Next, the inkjet recording principle as one of representative examples for applying color materials to a sheet member such as a paper sheet will be simply described.

As an inkjet record, various methods are provided based on the inkjet recording principle. As one example of the inkjet recording principle, a thermal inkjet method using heat will be described. In this embodiment, the thermal inkjet method will be described but an on-demand method using another piezo, and an inkjet of a continuous flow type, a so-called "charge-control type" can be also preferably applied to the present invention.

Figure 4A:
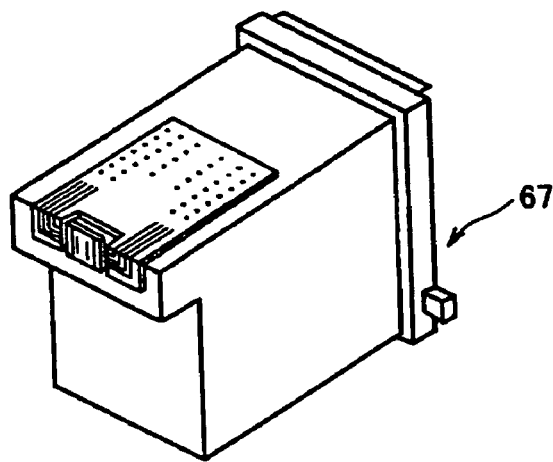
FIG. 4A and FIG. 4B are diagrams for explaining an example of a recording apparatus of an inkjet principle according the embodiment of the present invention.
Figure 4B:
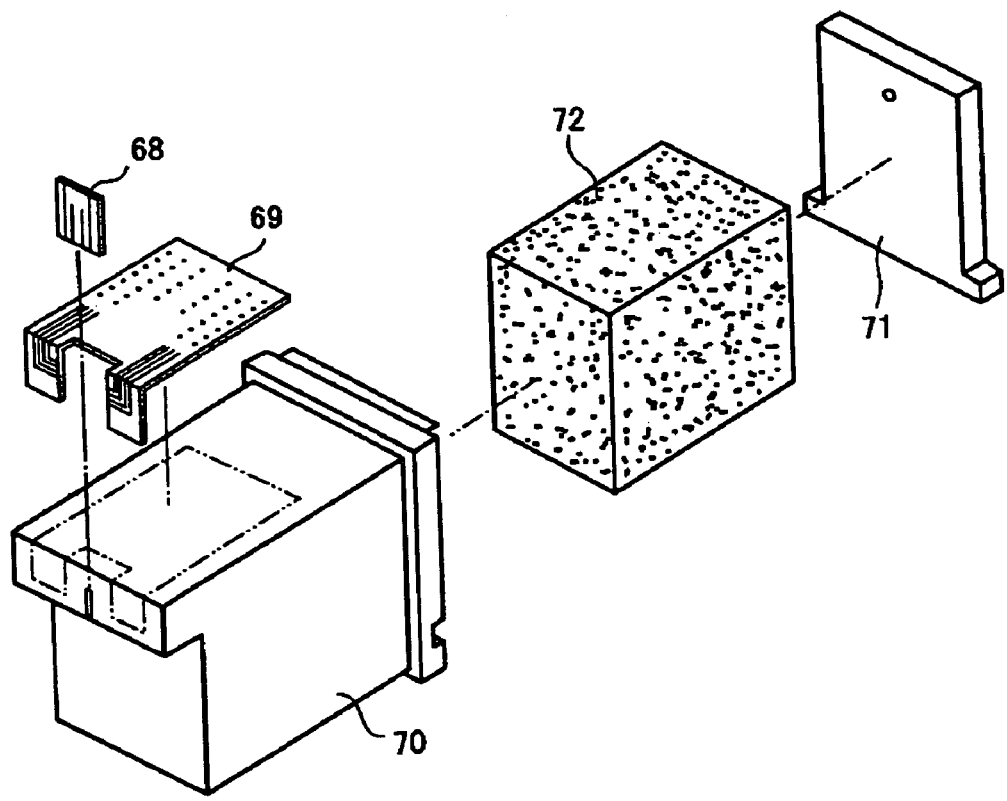

An example of an inkjet head unit 67 will be described with reference to FIG. 4A and FIG. 4B. FIG. 4A is a perspective view of the entire inkjet head unit, and FIG. 4B is a perspective view of decomposed parts of the inkjet head unit. The inkjet head unit 67 is formed by integrating a head chip 68 including a nozzle spraying microscopic ink droplet having a diameter of 10 μm to 30 μm (in shapes other than round, an opening is approximately 100 $\mu m^2$ through 700 $\mu m^2$ by a surface conversion) and an ink container 70 for supplying ink. The head chip 68 is connected to an FPC (Flexible Print Circuit) 69. In the head chip 68, by contacting an electric contact provide to the FPC 69 to a contact point (not shown) at a carriage side, the electric signal is received from a printer main body, and the ink is jetted to record. The inkjet head unit 67 further includes a back cover 71 and an ink absorbing element 72. The ink absorbing element 72 is a sponge holding the ink. By the ink absorbing element 72, even if the carriage moves and oscillates, no ink bubble occur in the ink container 70. When the ink held in the ink absorbing element 72 is depleted, the entire ink head unit 67 is replaced.

Figures 5A, 5B, 5C, 5D, 5E:
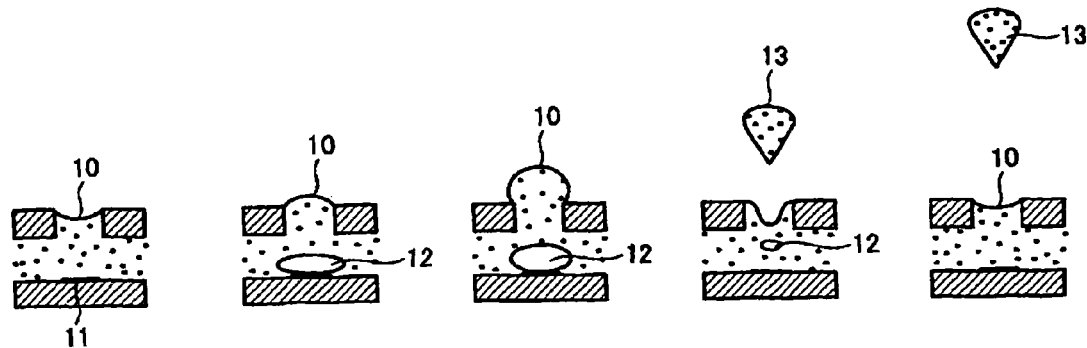
FIG. 5 is a diagram for explaining an example of a recording apparatus of a thermal inkjet principle according the embodiment of the present invention.

Next, a jetting principle of the ink will be described with reference to FIG. 5A, FIG. 5B, FIG. 5C, FIG. 5D, and FIG. 5E. FIG. 5A through FIG. 5E show cross sectional views showing a vicinity of a discharge opening in the thermal inkjet method. FIG. 5A shows a steady state in that a surface tension of an ink 10 and an external pressure are in an equilibrium state at the discharge opening. FIG. 5B shows a state in that a heating element 11 is heated, a surface temperature of the heating element 11 rapidly raises, a membrane boiling phenomena occurs on an adjacent ink layer, a boiling membrane is generated, and a bubble 12 grows. In this state, a pressure of the discharge opening raises by a growth of the bubble 12. Thus, a balance with an external pressure becomes irregular, and a pole of ink 10 (ink pole) starts to grow from the discharge opening. FIG. 5C shows a state in that the bubble 12 grows at maximum, the pole of the ink 10 (ink pole)

is pushed out from the discharge opening. In this state, electric current does not flow to the heating element 11, and the surface temperature of the heating element 11 is lowering. A volume of the bubble 12 becomes maximum slightly after a timing of applying an electrical pulse.

FIG. 5D shows a state in that the bubble 12 is chilled by the ink 10 and accommodated. A front end of the pole of the ink 10 (ink pole) advances while maintaining a speed of pushing out. At a rear end of the pole of the ink 10 (ink pole), the bubble 12 contracts and reversely flows by reduction of an internal pressure of the discharge opening. The pole of the ink 10 (ink pole) is constricted at a root. After that, the pole of the ink 10 (ink pole) is cut from a constriction portion, becomes an ink droplet 13, and jetted in the air. Since the external pressure becomes higher than the internal pressure at the discharge opening, a meniscus becomes greater, and enters the discharge opening. The front end of the ink droplet 13 has a speed of 8 m/s to 18 m/s, is jetted toward a recording sheet. FIG. 5E shows a state in that the ink 10 is refilled to the discharge opening by capillary phenomenon. After the ink 10 is refilled, the bubble 12 ceases completely in a process returning to the state shown in FIG. 5A.

Alternatively, another principle other than the above-described principle can be applied in that by the bubble 12 occurred by selecting a drive control of the heating element 11 and dimension of the discharge opening, approximately the entire ink reside in front of the bubble 12 is pushed out from the discharge opening. In this case, compared with the above-described principle, the phenomenon, in which the ink 10 reversely flows due to a deflation of the bubble 12 and the pole of the ink 10 (ink pole) is constricted at the root, does not occur. Accordingly, it is possible to realize an ink droplet formation frequency (drive frequency) for each discharge opening at 5 kHz through 50 kHz. Advantageously, a print speed is improved. (It is noted that in the above-described principle, a range of a steady drive is approximately 5 kHz to 12 kHz.)

Figure 6:
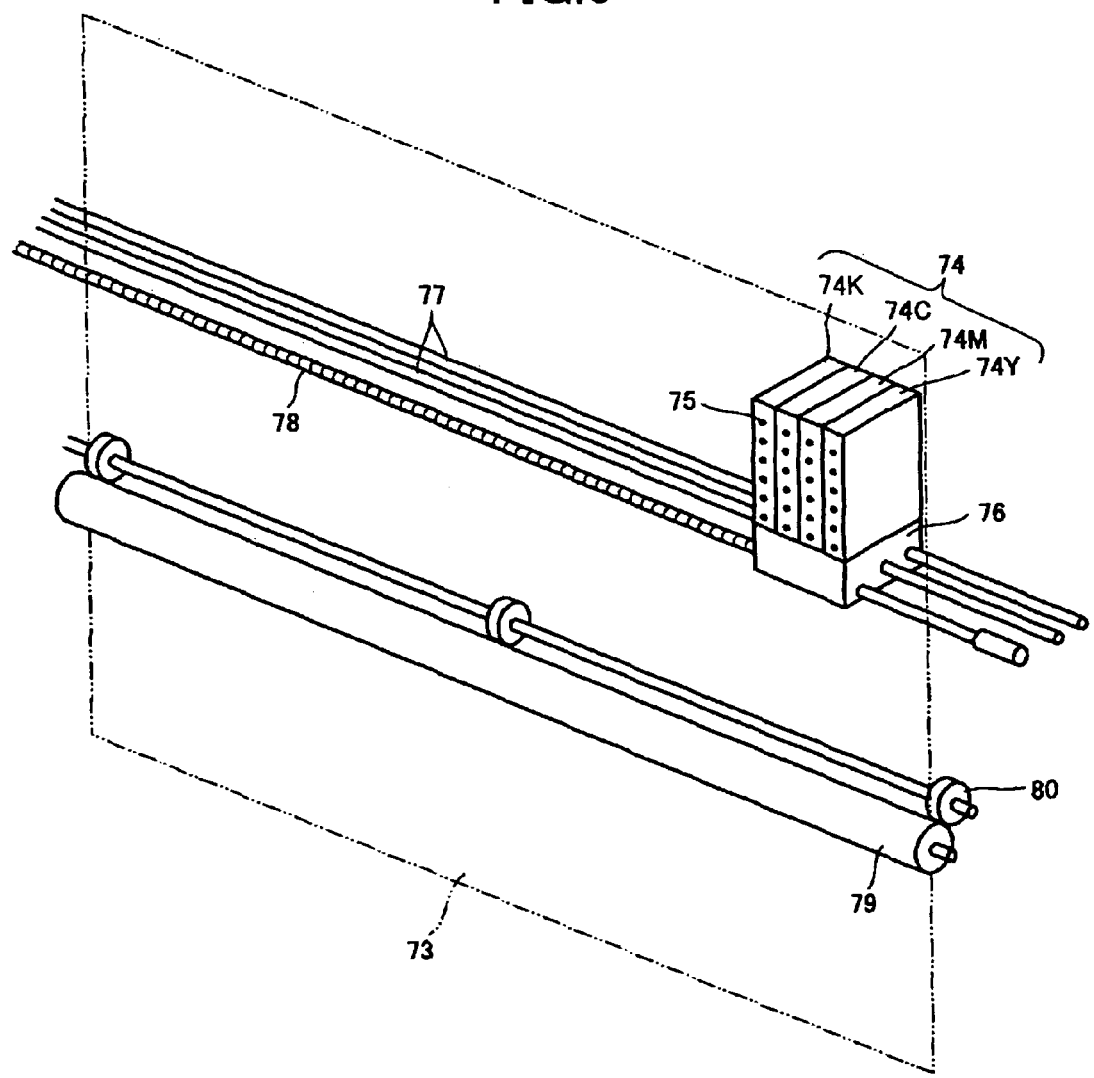
FIG. 6 is a diagram for explaining an example of a print operation of an inkjet record according the embodiment of the present invention.

Such an inkjet head unit 74 configured in the above-described principles is mounted to a carriage 76 as shown in FIG. 6 so as to conduct a print of three colors of yellow (Y), magenta (M), and cyan (C) or four colors adding black (B), and records while conducting a serial movement on a sheet surface.

FIG. 6 shows a recording sheet 73 and an inkjet head unit 74 (the inkjet head units 67 for four colors shown in FIG. 4A align as one unit, and sized of the inkjet head units 67 are adjusted to be formed as the one unit). Segment portions 74Y, 74M, 74C, and 74B of the inkjet head unit 74 can print yellow (Y), magenta (M), cyan (C), and black (K), respectively. Moreover, FIG. 6 shows nozzles 75, a carriage 76, guide rods 77 for the carriage 76, a threaded rod 78 for moving the carriage 76, a paper conveyance roller 79, and a sheet pressing roller 80 for the inkjet head unit 74.

As the representative examples for applying color materials to the sheet member, the output means of the electronographic principle and the inkjet principle are described above. Based on usage, one of MFPs having different output means is appropriately selected.

For example, in a case of the electronographic principle, a high speed output can be realized at 20 sheets to 100 sheets or more sheets of an A4 size per one minute.

On the other hand, in a case of the inkjet principle, a color output can be realized by a relatively simple configuration. In the electronographic principle, a size of a sheet is limited to output by a photoreceptor drum. On the other hand, in the inkjet principle, there is no such limitation to output. Thus, a print and output can be realized to a larger size of a sheet (an A0 size to an A2 size) and a longer sheet such as a banner shape.

Figure 7:
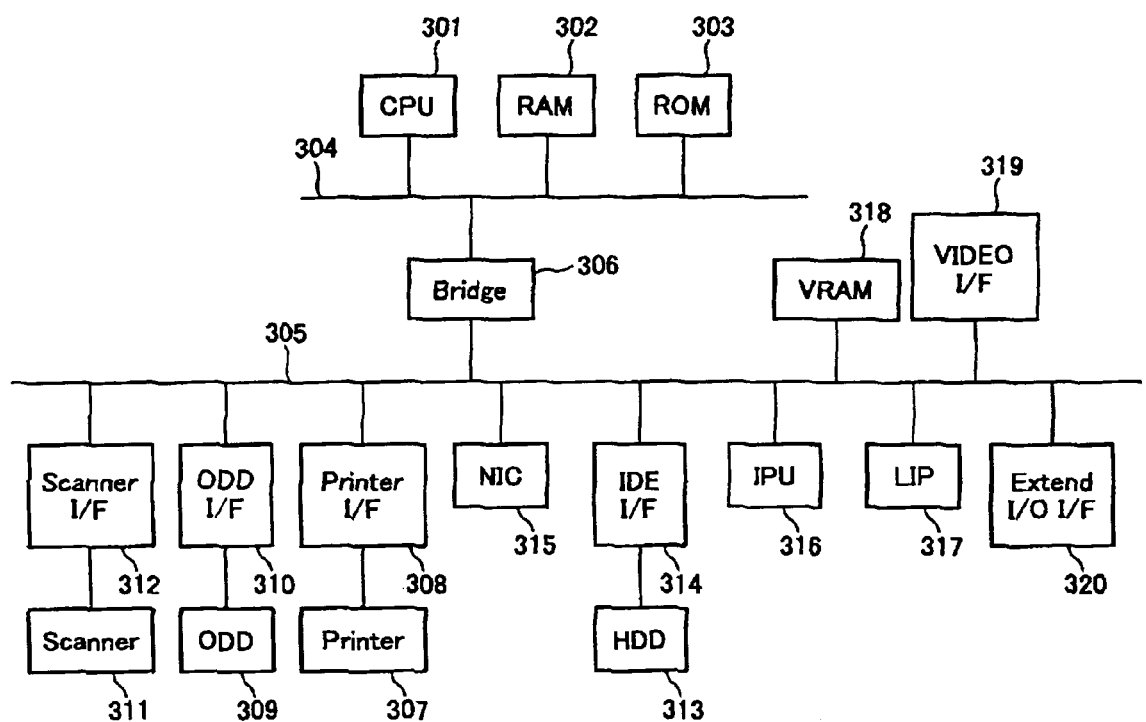
FIG. 7 is a diagram for explaining a hardware configuration including a printer part, an optical memory, a scanner, and a hard disk as electric processing parts according the embodiment of the present invention.

FIG. 7 shows a hardware configuration of one example of the system according to the present invention. In FIG. 7, details show a configuration of a portion for processing an electronic signal of a printer part which conducts a print to a recording medium such as a paper, a configuration of a portion for processing an electronic signal of an information writing part which writes information to an optical memory, and a configuration of a portion for processing an electronic signal of an information reading part from a scanner.

Moreover, in FIG. 7, a CPU (Central Processing Unit) 301 is shown as a part for controlling each part of a printer. A RAM (Random Access Memory) 302 temporarily stores a result of an operation by the CPU 301, and image data processed by the printer and the like. A ROM (Read-Only Memory) 303 stores a program for the CPU to operate, and font data for generating the image data. A local bus 304 is used to connect the CPU 301, the RAM 302, and the ROM 303. An I/O bus 305 is an internal bus for a function enhancement. A bridge circuit 306 is used to connect the local bus 304 and the I/O bus 305 to each other.

A printer part 307 is a part for forming an image to the recording medium such as the paper. As the printer part 307, various methods such as the inkjet method (the thermal method, the piezo method, or the like) other than the electronographic principle (Carlson process) described above can be used. A printer interface part 308 is used to connect the printer part 307 to the I/O bus 305, and can transfer the image data stored in the RAM 302 to the printer part 307 in accordance with an instruction of the CPU 301.

An optical disk drive 309 reads information from an optical disk (memory), and writes information to the optical disk (memory). An optical disk drive interface part 310 is used to connect the optical disk drive to the I/O bus 305. The optical disk drive interface part 310 can transfer electronic data transferred from the optical disk drive to the RAM 302 and transfer the electronic data from the RAM 302 to the optical disk drive 309, in accordance with an instruction of the CPU 301.

A scanner part 311 reads an optical signal from the original placed on an original plate (not shown), converts the optical signal into the electronic data by using a CCD or a like, and transfers the electronic data. A scanner interface part 312 is used to connect the scanner part 311 to the I/O bus 305. The scanner interface part 312 can transfer the electronic data read from the original transferred from the scanner part 311 to the RAM 302, in accordance with an instruction of the CPU 301.

An IDE interface part 314 and a hard disk drive 313 spools image data, and stores a program for the CPU 301 to conduct various processes.

A network interface controller 315 is used to connect to a local area network (LAN). An image processing unit (hereinafter, called an IPU) 316 conducts an image process such as a resolution conversion.

A luster image processor 317 develops image data of a page description language externally transferred through the network interface controller 315 into a bitmap image in accordance with an instruction of the CPU 301, and is used to store developed bitmap data to the RAM 302. A video interface part 319 is an interface to display screen data stored in a VRAM (Video RAM) at an external CRT (Cathode Ray Tube) or LCD (Liquid Crystal Display). An extended I/O interface part 320 is an interface circuit for the CPU 301 to communicate with a mobile device or a like. A communication method may be a serial communication, communication methods using a bi-centro interface, Bluetooth, or a like.

As seen in the above explanation, in the present invention, an input part for inputting information, a processing part for processing information, a storing part for storing information, and an output part for outputting information are included, and exchange information with each other by connecting to a network by a wireless communication, a wired communication, an optical transmission, and a like. The input part, the processing part, the storing part, and the output part are distributed separately from each other. If necessary, all parts or devices are centralized, arranged and configured at one place.

In the present invention, the input part of information is not only a scanner part but also an I/O interface part. Moreover, the input part may include an information input means such as a keyboard, a touch panel, an image capture device of a digital still camera, a digital video camera, or a like, and a like, of which explanations will be omitted. Moreover, regarding the processing part and the storing part, meanings thereof include not only a device, a CPU, a RAM, and a ROM as device units but also a PC, a server, and a like which are embodied in a network system. Similarly, the output part includes an I/O interface part, a display of information display, various printers, an information writing device such as a storage/memory, and a like.

As described above, the system according to the present invention can be distributed or centralized at one place. Moreover, the color image forming apparatus MFP (Multi-Function Printer, or Multi-Function Peripheral) preferably include a desired device, a server function, a memory having a large capacity, and the MFP is arranged in the system according to the present invention. That is, such a network system or various functions are condensed and integrally configured into a single machine of the MFP. Accordingly, by the MFP, the enter operation can be revolutionarily realized in a single image forming apparatus.

Figure 8:
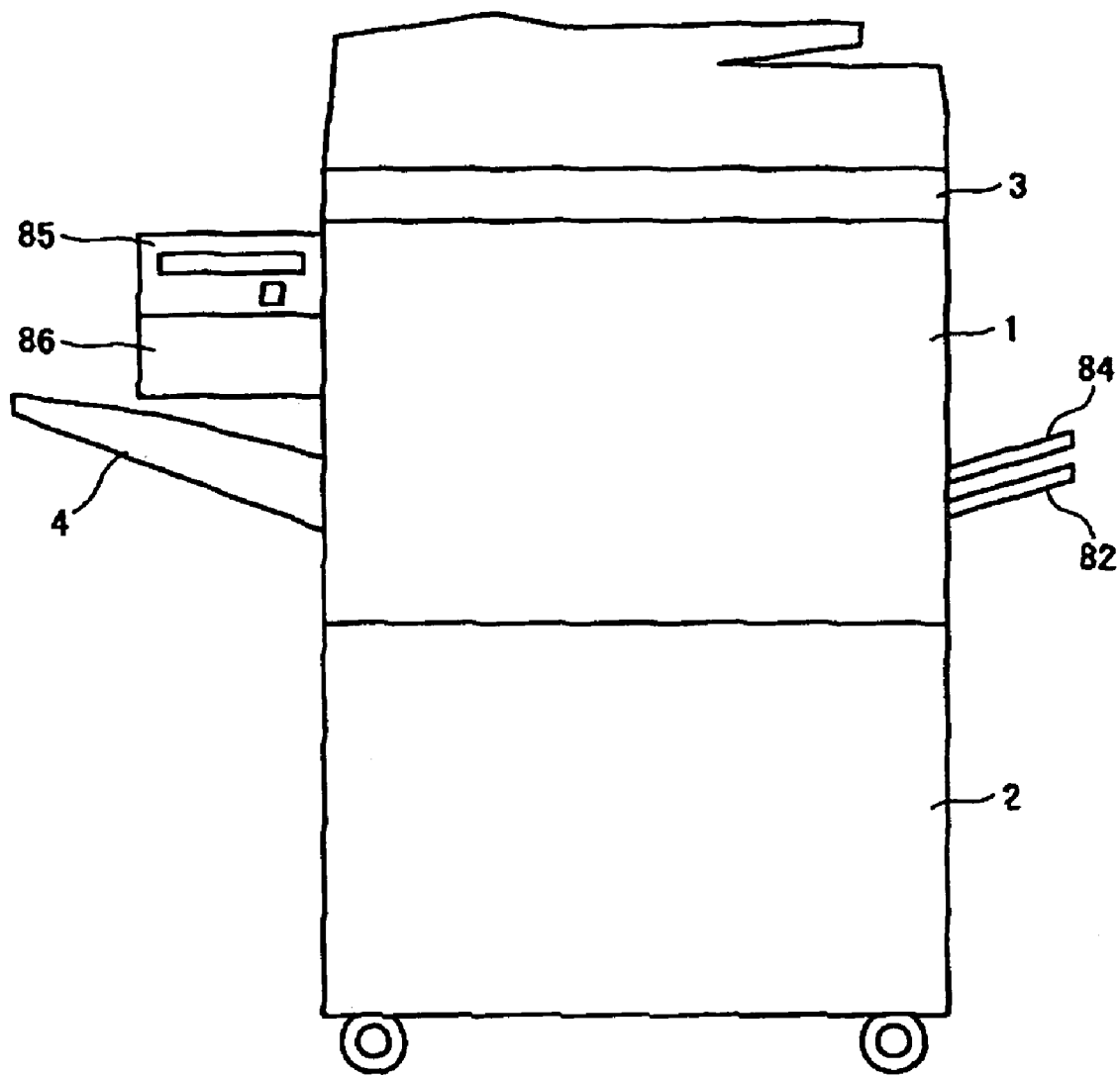
FIG. 8 is a diagram for explaining a configuration embodying an optical drive unit in an MFP according the embodiment of the present invention.

FIG. 8 is a diagram showing a configuration embodying an optical disk drive into the MFP of the electronographic principle (Carlson process) being an output function for outputting to a paper, as one example. In FIG. 8, an optical disk drive unit 85 and a media stock part 86 which is unused are shown. In this example, the electronographic principle (Carlson process) is used as an output device for outputting to the paper. Alternatively, the inkjet principle described above can be applied.

For example, in a usage method, a data file is converted into a Word™ file, an Excel™ file, or a PowerPoint™ file of the Microsoft company, or a PDF file of the Adobe company, and stored in an internal memory of the MFP. Then, the data file is output to the paper if necessary. Moreover, by using the optical disk drive unit 85 including the data file, the data file is sent from the media stock part 86, or the data file is burned onto an unused DVD-R, a DVD-RW, or a like provided to the MFP. An optical disk (portable storage) including electronic data is created. In this case, an output to the paper and a creation of the optical disk may be conducted (approximately) at one time. If necessary, only one of the output to the paper and the creation of the optical disk may be conducted.

Moreover, output format information is written to a portable storage medium such as the optical disk. The output information includes not only information of an output (print out) of letters and images when the color materials are applied (printed out) onto a sheet member such as a recording sheet, but also information indicating how the letters and images are output (a layout, a double side print, a single side print, or a like), information indicating how a gathering print is conducted when a plurality of sheets are printed out, and information indicating whether or not a stapler is used.

By writing information to a portable recording medium, even if a printed-out paper document is lost or discarded, it is possible to recreate or reproduce the same paper document having the same condition by using the portable recording medium.

Furthermore, the portable recording medium such as the optical disk or the like applied to the present invention has a storage capacity overwhelmingly larger than the sheet member such as the recording sheet. Thus, the portable recording medium can record information in which original data are processed, other than the above-described output format. For example, the portable recording medium can simply record code information of characters in addition to document information in which a layout and an output format are defined, and can record information before compression in addition to information in which image information is compressed. As described above, by not only simply recording information of an output of the paper sheet to the portable recording medium but also recording various raw information and/or process information, it is possible to effectively use information recorded in the portable recording medium. Since the portable recording medium has a recording capacity overwhelmingly larger than the papers, the portable recording medium is capable of recording more information (print out information) than the papers.

As described above, the MFP according to the present invention is an information input/output apparatus including the printer function, the scanner function, the facsimile function, the data storage function, the data edit function, the electric mail distribution function, the network server function, and the like. Moreover, the MFP can be connected to a communication network such as a local area network (LAN) or the Internet through the network interface controller 315 or the like. In this case, in the MFP, image information is read by the scanner, is compressed by JPEG or a like, and is distributed to a PC (Personal Computer) connected to the network by electric mail by the wired communication or the wireless communication.

On the communication network such as the Internet, various servers are connected. For example, there are a search server for searching for information, a distribution server for conducting a server for accumulating electronic data and distributing the electronic data internally maintained in the distribution server in response to a request from a user, a server for conducting various services with respect to a portable device such as a mobile phone or a like, a server for conducting a service charging for the mobile device, and a like.

The MFP according to the present invention is the information input/output apparatus in which various functions (multi-function) are included in a single apparatus. A user conducts a predetermined operation at the MFP. The user can conduct a series of function operations such as a data edit, a print out, and a copy. Moreover, the user can send various data through the communication network such as the Internet.

As described above, the various data include video data (motion data) and picture data (static image) read by a digital video, a digital camera, or a like in addition to image information read by the scanner. The various data may be input and stored to a recording part (memory) inside the MFP directly from the digital video, a digital camera, and a like. The various data may be input and stored to the MFP by using the portable recording medium. Moreover, based on data type, the various data may be appropriately compressed and stored by using a compression technology such as JPEG, MPEG, GIF, TIF, or a like.

In addition, a data file converted into a Word™ file, an Excel™ file, or a PowerPoint™ file of the Microsoft company, or a PDF file of the Adobe company is stored in an internal memory of the MFP by a network distribution. That is, the MFP according to the present invention includes functions such as a data bank, a data library, and a like.

In this case, the MFP according to the present invention as a network center machine sends an instruction to various information processing apparatuses and PCs, receiving various data and files held by the various information processing apparatuses and PCs, and stores the internal memory of the MFP. This operation can be conducted by the user conducting a predetermined operation at the MFP. Also, this operation can be conducted by the user conducting an operation from a PC or a like connected to the network to send an instruction to the MFP, so that MFP executes the operation in response to the instruction from the PC used by the user (for example, the MFP stores data in the internal memory). In order to store data to the internal memory of the MFP, the user can use the portable recording medium.

The various data stored in the MFP can be edited in accordance with an instruction of the MFP itself by an operation of the MFP conducted by the user, and can be sent to the various information processing apparatuses and PCs by the network distribution. Moreover, the various data can be sent to the plurality of the various information processing apparatuses and PCs at one time.

On the other hand, in the present invention, the MFP can be used as a network terminal in addition to the network center machine or the network server.

In this case, the MFP receives an instruction and a request from the various information processing apparatuses and PCs connected to the network, and conduct functions of editing the various data, distributing the various data, outputting the various data to a paper medium (document output), outputting the various data to the portable recording medium (creation of the portable recording medium including the various data) which will be described later, and a like. In this case, by instruction received from the various information processing apparatuses and PCs connected to the network, the MFP can be operated as the network server which distributes the various data to destinations in the plurality of the information processing apparatuses and PCs simultaneously or sequentially.

Next, as the representative example of the portable recording media and storages applied to the present invention, the optical disk will be illustrated and described. Also, other media other than the optical disk can be applied to the present invention.

FIG. 9, FIG. 10, FIG. 11, and FIG. 12 are diagrams for explaining means for supplying and conveying an optical disk medium in which information is unwritten to an optical disk drive unit according to the present invention.

In the present invention, a plurality of optical disk media are stocked before the information is written, and conveyed for every one by one to the optical disk drive unit if necessary, and the information is written to one or more optical disk media.

Figure 9:
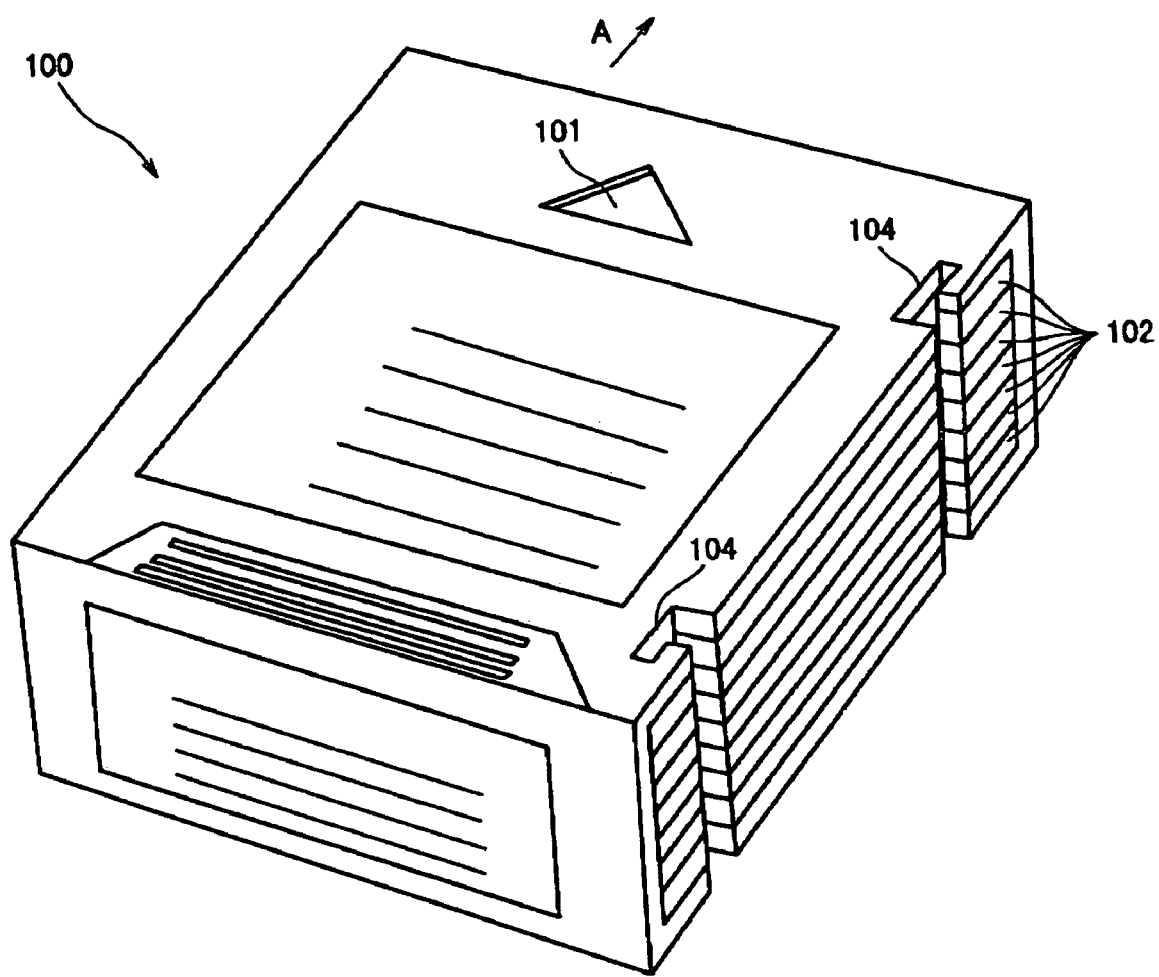
FIG. 9 is a perspective view of an exterior appearance of a magazine accommodating a plurality of optical disk media in which information is unwritten, according the embodiment of the present invention.
Figure 10:
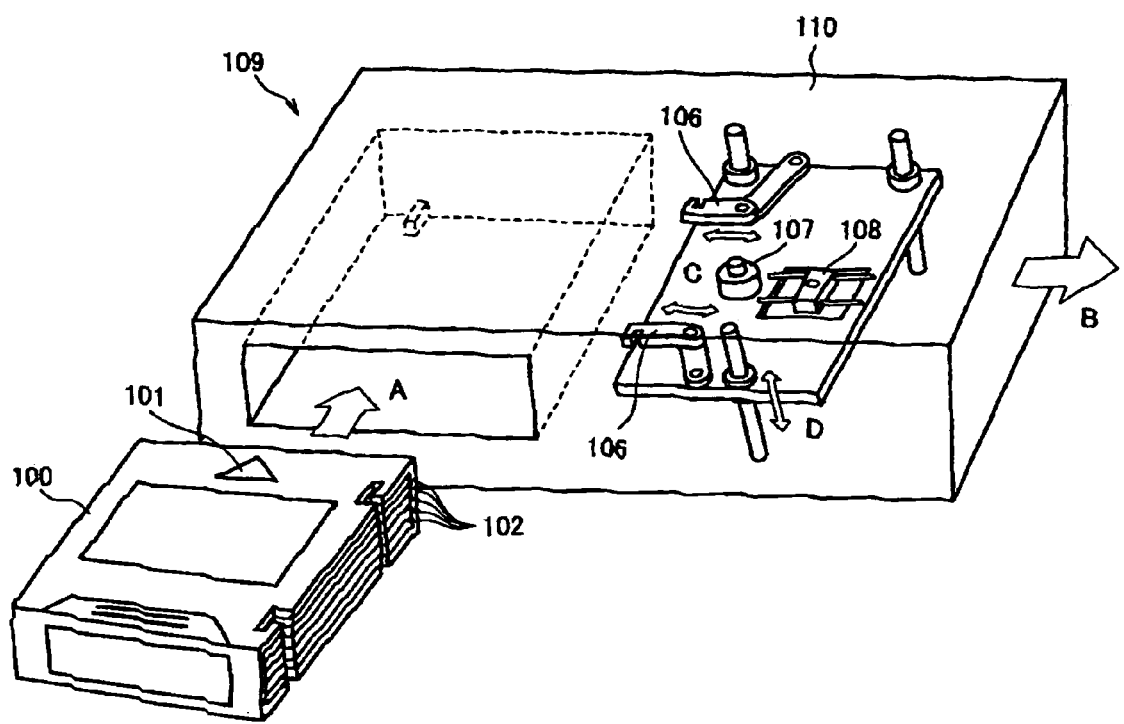
FIG. 10 is a diagram for explaining operation principles of mounting an optical disk medium to the optical disk unit, writing information, ejecting the optical disk medium, according the embodiment of the present invention.

FIG. 9 is a diagram showing a magazine 100 in which the plurality of optical disk media (in this example, seven optical disk media) is accommodated, according to the present invention. In FIG. 9, a triangular direction mark 101 shown on a magazine surface of the magazine 100 is directed to an arrow A. As shown in FIG. 10, the magazine 100 is inserted into the optical drive unit 109 in a direction along the arrow A.

Figure 11:
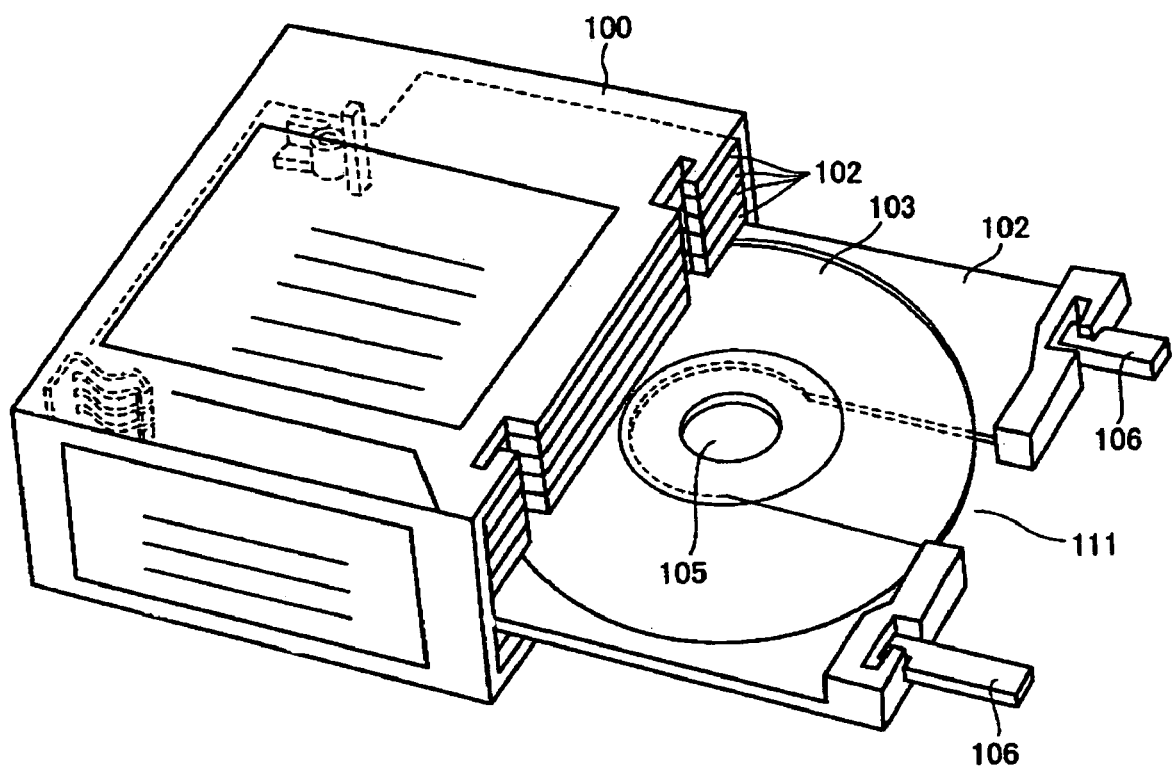
FIG. 11 is a diagram for explaining an operation for conveying the optical disk medium to a writing part after the optical disk medium is inserted into the magazine, according the embodiment of the present invention.

FIG. 11 is a diagram for explaining an operation for conveying the optical disk medium 103 after inserted, to a writing part 110 of the optical disk drive unit 109 shown in FIG. 10. The optical disk medium 103 mounted to a conveyance tray 102 has two hooks 106 latched to hook grooves 104 provided to the conveyance tray 102, and is pulled out by a hook 106 operating in a direction of an arrow C shown in FIG. 10.

Figure 12:
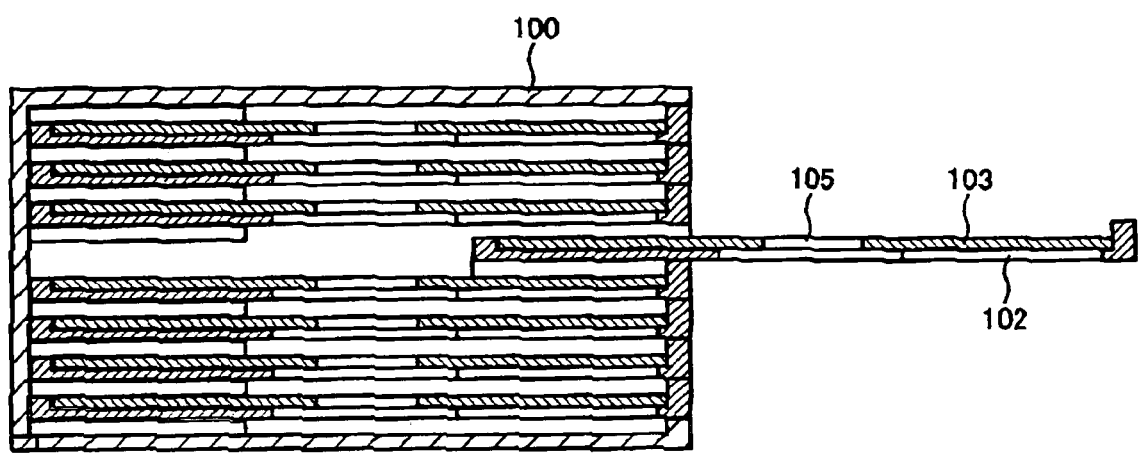
FIG. 12 is a cross sectional view of a state in that the optical disk medium mounted on a conveyance tray is pulled out, according the embodiment of the present invention.

FIG. 12 is a cross-sectional diagram showing a state in which the optical disk medium 103 mounted on the conveyance tray 102 is pulled out.

After that, at the writing part 110, the optical disk medium 103 engages a hole 105 with a rotation axis 107 shown in FIG. 10 by using a vertical movement (operation in a direction of an arrow D in FIG. 10) of the writing part 110, and the conveyance tray 102 is retracted back into to the magazine 100. A notched part 111 is provided to the conveyance tray 102 in order to retract the conveyance tray 102 to the magazine 100 even if the optical disk medium 103 is engaged with the rotation axis 107.

After the rotation axis 107 is engaged with the hole 105, the optical disk medium 103 writes information to a recording layer of the optical disk medium 103 by using a laser beam illuminated from the pickup 108. After the information is written by a pickup 108, by means (not shown) equivalent to the means described in the conveyance operation, the optical disk medium 103 is conveyed in a direction of an arrow B shown in FIG. 10, and ejected, and an writing operation ends.

In the above, one example of means for supplying and conveying the optical disk medium 103 to write information to the optical disk drive unit 109 according to the present invention is described. The optical disk medium 103 according to the present invention is not limited to a disk-shape type (an outer diameter 120 mm, a thickness 1.2 mm, a hole diameter 15 mm, and a memory capacity 650 MB or 700 MB in a CD format). The optical disk medium 103 can be a similar disk-shape type of the outer diameter 80 mm, and the memory capacity 185 MB in the CD format, a name card size having a rectangular shape (card type) of 58 mm×86 mm×1 mm and the memory capacity 18 MB through 50 MB in the CD format, or any optical disk medium of a start shape, an egg type, and any other outer shapes and sizes.

Moreover, depending on a usage, the memory capacity can be selected and used from 20 MB through 700 MB in a CD format using a laser wavelength 780 nm, 4.7 GB through 17 GB in a DVD format using the laser wavelength 635 nm or 650 nm, and 23.3 GB through 27 GB (15 GB for one side and 30 GB for both sides of HD DVD) in a format such as Blue-ray disc using a blue color laser of a wavelength 5 nm (or HD DVD).

In a viewpoint of a principle difference in addition to the recording density and the recording capacity, a photosensitive organic dye (cyanine, phthalocyanine, azo, squalirium, and a like) is used for a data recording layer. This organic dye is exposed by a laser beam stronger than a reading operation, and a semi-permanent reflectance change is caused to the organic dye, so that this semi-permanent reflectance change records data and only one time is available to record data. Such a medium is called a recordable medium (R medium).

Due to a recording format and a different capacity, there are a CD-R, a DVD-R, a DVD+R, and a like. Since a reflectance change of the organic dye is semi-permanent and a nonreversible reaction, only one time is allowed to record information. However, the organic dye is used and a recording layer can be formed indoors. Advantageously, a mass production can be realized, and a production cost can be less than a writable medium which will be described later. Moreover, theses recordable media are preferable to be used as archives. In a case in that no correction of record data is needed, or in a case of protecting from being tampered, these recordable media are preferable and significantly used.

Moreover, since a price of one medium is reasonable, it is significantly useful for a use method in that data (a data file or a like) of a paper document are recorded as electronic data to a recordable medium and distributed to a large number of persons simultaneously when a paper document is output.

Furthermore, as another optical memory medium, there is a rewritable medium (RW medium) using a phase-changeable material of a crystal and an amorphous for the data recording layer. For example, as the phase-changeable material, there is an alloy of four elements Ag—In—Sb—Te (Argentum-Indium-Antimony-Tellurium).

A crystal phase is immediately raised to a melting point by an elevation of temperature, and an irregular atomic state is created. This irregular atomic state is an amorphous state. Next, when the amorphous state is rapidly chilled, atoms are frozen without separation of the atoms. Thus, even if a temperature is decreased, an amorphous phase is still formed.

On the other hand, the temperature is raised approximately to an intermediate level, which does not reach the melting point, and the temperature is managed so as to be relatively slowly chilled. In this case, the atoms are combined to be an original state, and the crystal phase is formed. In a case of deleting data, as described above, the data recording layer is changed to be the crystal phase.

The amorphous is a random state of an array of the atoms. The reflectance is lower than the crystal. Such changes are called pit and land. In order to reproduce two temperatures, for the rewritable medium (RW medium), lasers having different outputs are mounted.

The crystal and the phase change of the amorphous are reversibly reacted. Thus, different from the recordable medium (R medium), it is possible to rewrite data to the rewritable medium.

Also, as the rewritable medium, there are a CD-RW, a DVD-RW, a DVD+RW, and a like depending upon the recording format and the different memory capacity.

Also, the Blue-ray Disc using the blue color laser having a wavelength 405 nm, the HD DVD, and the like can realize the recordable medium (R medium), and the rewritable medium (RW medium) by using a material having a nonreversible reaction or a reversible reaction, and can be preferably used in the present invention.

The above-describe optical memories, as described with reference to FIG. 9 and other figures, are supplied per the magazine 100 accommodating a certain quantity of optical disk media. In a case of requiring a high speed writing process, the optical disk media stocked in the magazine 100 may be formatted beforehand.

For example, a format will be described by illustrating an example of the CD. In a case of writing data to the CD-R by using Windows™, there are logic formats (for example, Romeo, Joliet, RockRidge, ISO9660, and a like) for various operating systems (OS). In the MFP according to the present invention, instead of formatting the optical disk medium for each time data are written, for example, the optical disk medium are formatted in ISO9660 level 1 readable by most operation systems beforehand, and are accommodated in the magazine 100. Accordingly, when the writable medium is accessed, a time required to format the writable medium is eliminated, and data can be immediately written to the writable medium. It is possible to reduce a creation time of the optical disk medium in which information is written.

In general, by a format which is frequently used at the most, the optical disk medium is formatted to be immediately used and supplied (the optical disk medium being formatted is mounted at a pickup portion of a drive). However, there is a case of attempting to use a different format to write data. Considered above, a means for supplying the optical disk medium may include two or more format systems.

For example, in general, in a case of the most frequently used format, the optical disk medium is formatted beforehand and then supplied. For the case of attempting to write in another format, a not-formatted optical disk medium is prepared. Even if the optical disk creation requires more or less extra time, the format of the optical disk medium and a data writing process are conducted by the MFP (a writing drive inside the MFP).

As shown in FIG. 9, a plurality of optical disk media which is formatted and a plurality of optical disk media which is not formatted are accommodated in the magazine 100 and are supplied, respectively. Alternatively, only for the most frequently used format, a plurality of optical disk media are accommodated and supplied in the magazine 100. Since a special format which is occasionally used is not frequently used, every one optical disk medium may be manually supplied.

As describe above, a standard optical memory is mainly described as the portable recording medium or storage according to the present invention. As other portable recording media which can be preferably used in the present invention, there are a magneto-optical disk known as an MO, and a magneto-optical memory. The memory capacity can be selectively applied from 128 MB, 230 MB, 640 MB, and a like based on a usage.

An operation principle is to heat the recording layer of a disk formed by as a magnetic material (as the magnetic material, various types of magnetic garnets, alloys of manganese and bismuth, ferrites of Bariums, or a like is used) by illuminating a laser beam, write (record) data by changing a direction of the magnetic material by applying a magnetic field when a temperature raises at approximately 200° C., to illuminate the laser beam having lower power than writing when data are read out, and detect a difference of reflected light, so as to read out data.

The MO has higher reliability because no head crash occurs. Similar to the above-described optical memory, the MO is a considerably preferable medium as the portable recording medium embodied in the information input/output apparatus according to the present invention.

Next, as another recording medium preferably used as the portable recording medium according to the present invention, there is a semi-conductor memory. In general, a memory such as a DRAM loses data when power is turned OFF. Thus, the memory such as the DRAM is inappropriate as the portable recording medium according to the present invention. On the other hand, a flash memory does not have the above described disadvantages of the DRAM. There are a USB flash memory, a smart medium, a Compact Flash™, a memory stick, and a like, which have various shapes such as a card type, a stick type, and a like, various sizes, various memory capacities, and a like, and any one of which is convenient to carry.

Similarly, as other non-volatile memories, there is a semiconductor memory known as EEPROM (Electrically Erasable Programmable Read Only Memory), which can be preferably used as the portable recording medium.

In any case described above, data are maintained even if the power is turned OFF. Moreover, different from the above-described optical memory, there is no movable portion required during an operation, and the memory such as the EEPROM is electrically controlled entirely to be used. In addition, a higher speed response and a higher reliability can be realized and the memory such as the EEPROM is considerably useful.

In the above, representative examples of various portable recording media and storages which can be applied to the present invention are described. However, the portable recording media and storages are not limited to the above-described examples, and other portable recording media and storages can be applied to the present invention.

In the present invention, regarding an output and a record of information, paper media and portable electronic information storages/recording media are integrated as a single apparatus (or an apparatus configured to be a system at one place) realizing an integration of media, in which the paper media and the portable electronic information storage/recording media are related to each other. Simultaneously or if necessary when the output of information is conducted to a paper medium (for example, print out), the information is recorded to a portable electronic information storage/recording medium, and a user can pick up both the paper medium and the portable electronic information storage/recording medium at a single apparatus (or an apparatus configured to be a system at one place).

Moreover, the magazine 100 containing a plurality of recording media or storages is detachably mounted to a main body of the apparatus. If necessary, the recording media or storages are conveyed to a drive part (information writing part, and a pickup part), and the information is written to the recording media or storages. The example of the optical disk is described above for these operations. However, the present invention is not limited to the optical disk, and other recording media or storages can be applied to the present invention. Even if various recording media or storages have different aspects of magazines, conveyances, means for writing (recording)/reading information, a similar concept can be applied according to the present invention. Also, for various recording media or storages, a certain quantity is stocked in a respective magazine.

In the same manner as described above in a portion of explaining the image forming apparatus, a plurality of portable recording media in which information has not been recorded are stocked. That is, in a case of successively producing a plurality of portable recording media in which information is written when the information is written to a portable recording medium (for example, an optical disk medium) mounted to the image forming apparatus according to the present invention, it is possible to eliminate workload of bringing and setting the plurality of portable recording media one by one to the image forming apparatus.

As described above, since the image forming apparatus according to the present invention is connected to the network and used, there are many cases in that a user remotely uses the image forming apparatus far from the image forming apparatus. It is not convenient for the user to bring and supply the recording sheets 20 and the plurality of recording media one by one to the image forming apparatus. Accordingly, it is significantly effective to stock the plurality of the recording media at the image forming apparatus.

As described above, the image forming apparatus according to the present invention produces the portable recording medium represented by the optical disk in which information is written based on an output (print out) of information to the paper document and output information. In general, a considerably larger capacity than an information amount of printing out to papers can be written (recorded) to the portable recording medium. Accordingly, as one example of a usage method of the present invention, in a case of writing information, which is equivalent to information output to the paper document, to the portable recording medium, depending on a data capacity of a document, in general, even if the paper document includes dozens of sheets through thousands of sheets (for example, at A4 size), it is possible to write information of the document to a single portable recording medium with a large amount of recordable space.

That is, in the present invention, in a case of simply counting the sheet-shaped members represented by the recording sheets by one, two, . . . sheet by sheet and counting the portable recording media by one, two, . . . disk by disk, the image forming apparatus according to the present invention needs to stock the sheet-shaped members more than the portable recording media. A ratio of a quantity of the sheet shape members to a quantity of the portable recording media is not always constant for various usage methods. However, considered an information amount of printing out to the sheet-shaped members and an information amount (recording capacity) possible to write to the portable recording medium, a paper feed tray (stock tray for the sheet-shaped members) and a magazine accommodating the portable recording media are required to have accommodating abilities so that at least, a stock capacity for the sheet-shaped member is more than ten times a stock capacity for the portable recording medium. By configuring both stock capacities corresponding to these accommodating abilities, it is possible to reduce a significant increase of supply frequencies of the sheet-shaped members and the portable recording media due to an unbalance between both stock amounts.

Furthermore, similar to the detection of the stock amount or the residual amount of the recording sheets 20 as previously described, in the present invention, with respect to the portable recording media, a stock amount or a residual amount of the portable recording media is detected. Similar to the case of the recording medium 20, it is possible realize by modifying means in the detection of the stock amount or the residual amount of the recording sheets 20 as previously described. That is, a light emitting element and a light receiving element are arranged so as to clamp a magazine accommodating the portable recording media, a presence and an absence of the portable recording medium is detected, and a quantity of the portable recording media is counted. Thus, it is possible to detect the residual quantity in the magazine.

In the following, features of the present invention will be described. In the present invention, as described above, the stock amount or the residual amount of each of the sheet-shaped members represented by recording papers and the portable recording media are detected.

In the conventional copier, technologies for detecting and displaying a shortage of sheets are generally implemented. Technologies for detecting the stock amount or the residual amount according to the present invention are different from the technologies of the conventional copier. That is, in the conventional copier, the technologies for detecting and displaying the shortage of sheets are simply to urge a user to supply the sheets. However, in the present invention, the stock amount or the residual amount of each of the sheet-shaped members represented by the recording sheets and the portable recording media is detected, and it stops applying color materials to the sheet-shaped members or writing information to the portable recording media when the stock amount of either one of the sheet-shaped members and the portable recording media becomes zero. For example, when the stock amount of the sheet-shaped members becomes zero, it stops writing information to the portable recording media. On the contrary, when the stock amount of the portable recording media becomes zero, it stops applying the color materials to the sheet-shaped members.

By this control, when the stock amount of one side becomes zero, an output (printing out to the sheet-shaped members or writing information to the portable recording media) is switched to another side and continued at another side. Accordingly, it is possible to avoid wasting consumption of the sheet-shaped members and the portable recording media.

Advantageously, the image forming apparatus according to the present invention can separately conduct to apply the color materials to the sheet-shaped members and write information to the portable recording media. More effectively, in the image forming apparatus, the same information is transferred by applying the color materials to the sheet-shaped members and writing to the portable recording media. Thus, the image forming apparatus can be used to simultaneously produce and distribute the same information. In this case, as described above, by setting to detect a zero state of the stock amount of one side, and to sending another side an instruction for stopping outputting (printing out or writing to the portable recording media) beforehand, it is possible to avoid wasting a production of unnecessary sheet-shaped members and the portable recording media (outputting the sheet-shaped members or writing information to the portable recording media) due to continuous outputs (writing information) at one side (applying the color materials to the sheet-shaped members or producing the portable recording media in which information is written).

Next, other portable recording media or storages applied to the present invention will be described. In the present invention, by the MFP described above, an output object (printed matter) is produced to the sheet-shaped material, and information is written to any one of various portable recording medium. The printed matter and the portable recording medium in which the information is written are distributed to persons to use. Moreover, there are many cases in that data of distribution material (printed matter and the portable recording medium recording the information) may be further modified or copied to use. In this case, it is difficult in a modern information society to specify where original information exists (who is a sender of the original information), where copied information exists (who possesses the copied information), and a like. In addition, in the modern information society, new information, which is tampered and to which additional information is included, is spread, and it is also difficult to specify where the new information exists.

Accordingly, in the present invention, information being spread, which is original or modified, is managed and specified with respect to the above-described matter. In the present invention, an IC chip, which is significantly smaller than 1 mm (substantially 0.5 mm through 0.05 mm) is applied as the portable recording medium, and a writer for writing information is mounted within the MFP according to the present invention or as an information input/output apparatus connected to a network. The IC chip is not used simply as a memory but is used as a chip realizing RFID (Radio Frequency-Identification) having a communication function. That is, the IC chip includes a reader/writer (an antenna and a controller), and an ID tag capable of recording information to an electronic circuit, so as to conduct data communication by wireless communication.

Each RFID chip has a subtly different characteristic due to a frequency band to be used. An RFID chip, which has a lower frequency band (134.2 KHz) possible to be used in a relatively longer communication distance, is not easily influenced from an external factor such as a noise, water, or a like. This RFID is used in many cases as an immobilizer internally mounted in a car key and an ID tag for an entry/exit management. Since a certain amount of an antenna coil is required to be wind on the RFID, the RFID is rather thick. On the other hand, another RFID used in a frequency band 13.56 MHz can be formed thinner. Furthermore, another RFID used in a micro-wave (2.45 GHz) can be formed smaller.

The RFID chip applied to the present invention internally mounts a CMOS chip having an IC chip and a communication circuit, and a micro-mini antenna, but does not include a power source. When data are read out or written in by the reader/writer, the power sources is always induced to the RFID chip by the wireless communication. Thus, since the RFID does not have a contact portion, a shape and usability of the RFID are flexible. Accordingly, as described later, the RFID is significantly useful to integrate with the sheet-shaped member and various portable recording media in which desired information is written, which are produced in accordance with the present invention.

In the present invention, a chip such as the RFID is integrated with the output material (printed matter) which are produced to the sheet-shaped members according to the present invention, and any one of various portable recording medium (for example, the optical memory, the magneto-optical memory, the semiconductor non-volatile memory, and the like) in which desired information is written. Information concerning the printed matter and the portable recording medium in which information is written, and information such as a background (indicating what is base information to form current (latest)) information is also written. Therefore, it is possible to trace various types of recording media being spread.

In this case, similar to writing information to the portable recording medium and memory, such information described above is written to the RFID in accordance with an instruction from the MFP. In addition, in a case of embodying a writer in a network information system, in accordance with an instruction sent from another information processing apparatus such as a PC, or a like, the information related to the printed matter and the portable recording medium to which information is written, and the information concerning the background of the written information is also written. Especially, in a case in that the writer is embodied in the network information system, a user is not required to remotely send an instruction for adding the information concerning the background of the written information to the RFID, without moving and operating at the information input/output apparatus.

As described above, since the RFID chip is significantly small, it is possible to integrate the RFID with the sheet-shaped member represented by the paper sheet. That is, since the paper sheet is made by fibers such as a pulp, the RFID chip being significantly small can be easily embodied in a space between fibers. The RFID chip can be internally embodied and integrated in a paper sheet when the paper sheet is completely finished into a paper production (papermaking step). Alternatively, after the paper sheet is finished, the RFID chip can be glued with a resin adhesive.

As the resin adhesive, any one of various adhesive can be used. For example, a heat-hardening adhesive such as an epoxy adhesive, and a UV (ultraviolet) hardening adhesive can be used. Since the epoxy adhesive has a higher adhesive ability, it is not easy to damage (remove the RFID chip from the paper sheet with which the RFID chip is integrated). Also, the UV hardening adhesive is quickly bonded in one second through several seconds by simply illuminating a UV light without contact.

As one of other integrating means, a thermal softening adhesive known as hot-melt adhesive and a hot-melt adhesive can be useful to use. In a case of arranging the RFID chip, by simply applying a resin with a hot melt gun, the adhesive can become easily cold and fixed at a circumference temperature (room temperature), so that the RFID is integrated with the paper sheet. As hot melt resin material, polyesters, nylons, or like are appropriately selected.

Moreover, as one of other integrating means, a thermal contraction resin made from polyolefin, neoprene, or a like, and materials known as thermal contraction tube can be used. The thermal contraction resin (resin tube) is heated with the RFID chip and a material to be integrated with the RFID chip, so that the thermal contraction resin is contracted, and the RFID chip and the material are integrated and fixed together. A dryer or a like can be simply used to heat the thermal contraction resin, and the thermal contraction resin is easily contracted by heated air applied by the dryer. Accordingly, the thermal contraction resin is significantly convenient and easy to integrate the RFID card and the material.

Moreover, as one of other integrating means, a toner can be used as a suitable method. In present invention, a toner image is formed on a sheet by using a Carlson process principle. In the toner, a coloring agent, a charge controller, a releasing agent, and further various external additives are added to a resin of styrenes (styrene-acrylic) or polyesters (polyester in a case of a polymerization), so that in a case of fixing the toner image to the sheet, the resin is soften and fixed by heat and pressure.

That is, since a main material of the toner is the resin as described above, the toner behaves a thermal softening adhesive. By including the RFID chip in the toner image before fixing, it is possible to adhere the RFID chip with the toner image when the toner image is fixed.

In the above, technologies for integrating the RFID chip, which is preferably used for the portable recording media according to the present invention, with the sheet-shaped member or another portable recording medium are described. Further to the technologies, in the present invention, an element having a RFID function as described above is printed and formed using the same principles as the means for applying the color materials to the sheet-shaped members.

As a specific example, the inkjet principle as described above is utilized and a solution containing a material of a π-conjugated system as described below is used as an organic semiconductor material. For example, there can be used polymers selected from the group including polypyrroles such as poly(pyrrole), poly(N-substituted pyrrole), poly(3-substituted pyrrole) and poly(3,4-disubstituted pyrrole); polythiophenes such as poly(thiophene), poly(3-substituted thiophene), poly(3,4-disubstituted thiophene) and poly(benzothiophene); polyisothianaphthenes such as poly(isothianaphthene); polythienylenevinylenes such as poly(thienylene vinylene); polyparaphenylenevinylenes such as poly(p-phenylene vinylene); polyanilines such as poly(aniline), poly(N-substituted aniline), poly(3-substituted aniline) and poly(2,3-disubstituted aniline); polyactylenes such as polyacetylene; polydiacetylenes such as poly(diacetylene); polyazulenes such as polyazulene; polypyrenes such as poly(pyrene); polycarbazoles such as poly(carbazole) and poly(N-substituted carbazole); polyselenophenes such as poly(selenophene); polyfurans such as poly(furan) and poly(benzofuran); polyparaphenylens such as poly(p-phenylene); polyindoles such as poly(indole); polypyridazines such as poly(pyridazine); polyacenes such as naphthacene, pentacene, hexacene, heptacene, dibenzopentacene, tetrabenzopentacene, pyrene, dibenzopyrene, chrysene, perylene, coronene, terrylene, ovalene, quaterrylene and circumanthracene; polyacene derivatives in which a part of carbons of the base polyacene is replaced with an atom such as N, S and O or replaced or substituted with a functional group such as a carbonyl group (for example, triphenodioxazine, triphenodithiazine and hexacene-6,15-quinone); poly(vinylcarbazole); poly(phenylenesulfide); and poly(vinylenesulfide).

Among these materials of the π-conjugated system, preferred is at least one kind of material selected from the group including oligomers in which the number of repeating units is 4 through 10 or polymers in which the number of repeating units is 20 or greater, wherein their repeating units are independently thiophene, vinylene, thienylene-vinylene, phenylene-vinylene, p-phenylene, substituted compounds derived therefrom or combinations of two or more kinds thereof; fused polycyclic aromatic compounds such as pentacene; fullerenes, fused ring tetracarboxydiimides; and metal phthalocyanines.

In addition, as other organic semiconductor materials, there can be used organic molecule complexes such as a tetrathiafulvalene (TTF)-tetracyanoquinodimethan (TCNQ) complex, a bisethylenetetrathiafulvalene (BEDTTTF)-perchloric acid complex, a BEDTTTF-iodine complex and a TCNQ-iodine complex. Further, a polymer of a σ-conjugated system such as polysilane and polygermane can be also used.

The above specific materials are merely examples and other materials may be used. For example, when a precursor is soluble to a solvent, which precursor may be, for example, pentacene, an intended thin film made of an organic material may be formed by heat-treating a film of the precursor which film is formed, for example, in accordance with a liquid jetting principle described below.

Furthermore, as a material for an electrode, for example, there can be preferably used publicly-known polymers with an electric conductivity improved, for example, by means of doping, such as electrically conductive polyanilines, electrically conductive polypyrroles and electrically conductive polythiophenes (such as a complex of poly(ethylenedioxythiophene) and poly(styrenesulfonic acid)) and a dispersed system in which nano-sized particles of platinum, gold, and/or silver (with a size of 1 through 50 nm) is dispersed, so as to form various kinds of wiring patterns or antenna patterns.

By using the above-described solutions to form a print pattern with the inkjet principle, the RFID chip equivalent to a conventional RFID chip is separately produced by an Si semiconductor process, the antenna and the electrode pattern are separately formed, and then the RFID tag is produced by integrating the RFID chip with the antenna and the electrode pattern. Therefore, it is possible to form entire RFID tag in the same printing process, and it is possible to significantly reduce a production cost. In this case, a jet head is separately provided for each of the solutions since a single jet head cannot be used for all productions using different solutions. However, the inkjet method according to the present invention can reduce the production cost to be lower than the conventional RFID chip (IC chip) production.

In the above, the example method using the inkjet principle is described. Alternatively, the above described method for applying the semiconductor and electrode materials can be used with a method using a screen print method or the principle for applying the toner with the Carlson process. Alternatively, a recording medium having the RFID function formed by this method may be printed on the sheet-shaped member to integrate together. For the portable recording medium, the RFID tag is printed to surface or a supporting member at an area where a function of the portable recording medium is not impaired. In addition, the RFID tag is printed to and integrated with a package member or a like.

As seen from the above explanations, in the present invention, the RFID chip to which the color materials are applied to the information input/output apparatus is attached to the sheet-shaped member and the portable recording medium. Even if the sheet-shaped member and the portable recording medium to which information is output is distributed, it is possible to trace where the sheet-shaped member and the portable recording medium having the information. In addition, it is possible to specify an original document and an original information source even if the sheet-shaped member and the portable recording medium having information are copied, tampered, added with new information, and spread.

Next, other features of the present invention will be described. In the present invention, as described above, data output to a paper medium is stored or recorded to the portable recording medium or storage. The portable recording medium or storage storing or recording the data output to the paper medium may be physically brought out by utilizing portability thereof.

Such information can be sent and received as electronic data through a network communication. Depending on circumstances, it is preferable or required to physically take out the portable recording medium or storage. For such reasons, the portable recording medium or storage according to the present invention is utilized. However, in a case of bringing out the portable recording medium or storage, since the portable recording medium or storage cannot be completely prevented from becoming dirty or damaged, the information may not be read out. After that, it becomes impossible to add data, or edit the information. Accordingly, in the present invention, the portable recording medium or storage is accommodated in an accommodating member and is used.

Figure 13:
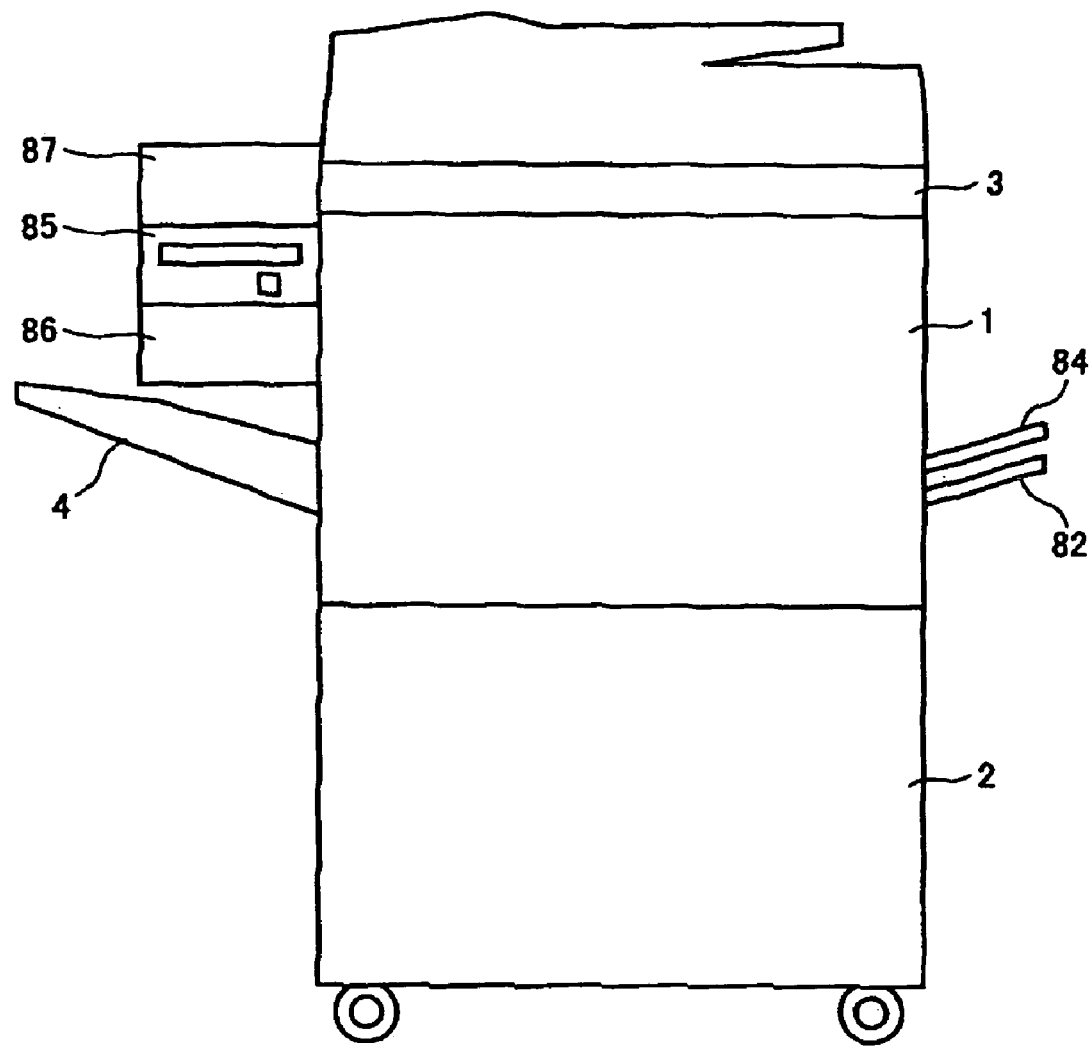
FIG. 13 is a diagram for explaining a configuration embodying the optical disk unit and the a stock part for storage members in the MFP, according the embodiment of the present invention.

FIG. 13 is a diagram showing a first configuration according to the present invention, as an example of the MFP using the electronographic principle (Carlson process) as an output apparatus with respect to the sheet-shaped member represented by the paper. As previously described, the inkjet principle can be applied to the MFP. As the portable recording medium or storage, an optical disk is used. In FIG. 13, the optical disk unit 85, a medium stock part 86 for unused media, and a stock part 87 of a storage member.

In a usage method, as described with reference to FIG. 8, for example, a data file is converted into a Word™ file, an Excel™ file, or a PowerPoint™ file of the Microsoft company, or a PDF file of the Adobe company, and stored in an internal memory of the MFP. Then, the data file is output to the paper if necessary. Moreover, by using the optical disk drive unit 85 including the data file, the data file is sent from the media stock part 86, or the data file is burned onto an unused DVD-R, a DVD-RW, or a like provided to the MFP. An optical disk (portable storage) including electronic data is created. In this case, an output to the paper and a creation of the optical disk may be conducted (approximately) at one time. If necessary, only one of the output to the paper and the creation of the optical disk may be conducted. After the data file is written to the optical disk, the optical disk medium 103 is accommodated in the storage member 88 accommodated in the stock part 87 of the storage member, and then the optical disk medium 103 is in a safety state to be taken out.

Figure 14A:
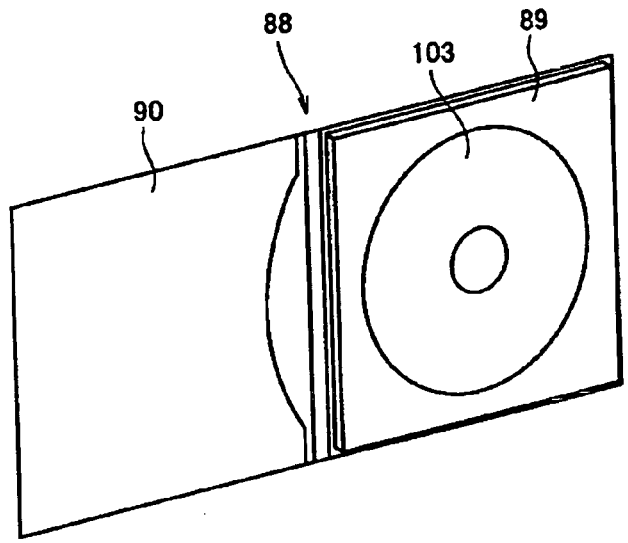
FIG. 14A and FIG. 14B are diagram for explaining a configuration for accommodating an optical disk medium being a disk type, according the embodiment of the present invention.
Figure 14B:
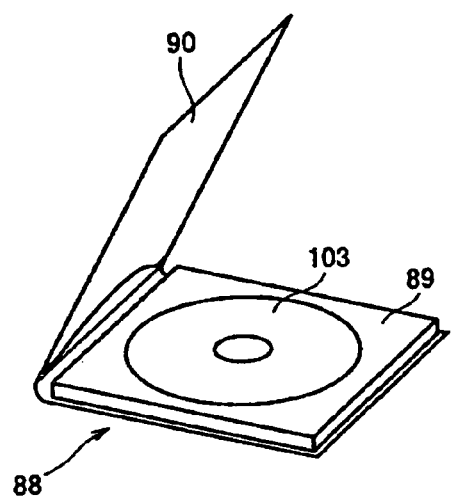

FIG. 14A and FIG. 14B and FIG. 15 through FIG. 21 are diagrams showing examples of accommodating the optical disk medium 103 in the storage member 88. In FIG. 14A through FIG. 21, the storage member 88 is made from plastic, vinyl, paper, or a like. Referring to FIG. 14A and FIG. 14B, a storage 89 accommodates the optical disk medium 103. A cover part 90 is provided to the storage member 88 if necessary. FIG. 14A shows a state in which the cover part 90 is opened, and FIG. 14B shows a state in which the cover part 90 is semi-closed.

FIG. 14A and FIG. 14B and FIG. 15 through FIG. 18 illustrate that the optical disk medium 103 of a disk type having a diameter 120 mm is accommodated. FIG. 14A and FIG. 14B illustrate that the optical disk medium 103 is accommodated in a plastic case. At a center of the storage 89, a protrusion portion (1 mm through 2 mm) having an external diameter 15 mm is provided so as to engage with a hole having a hole diameter 15 mm of the optical disk medium 103. The protrusion portion is engaged with the hole of the optical disk medium 103. The cover part 90 can be opened and closed.

Figure 15:
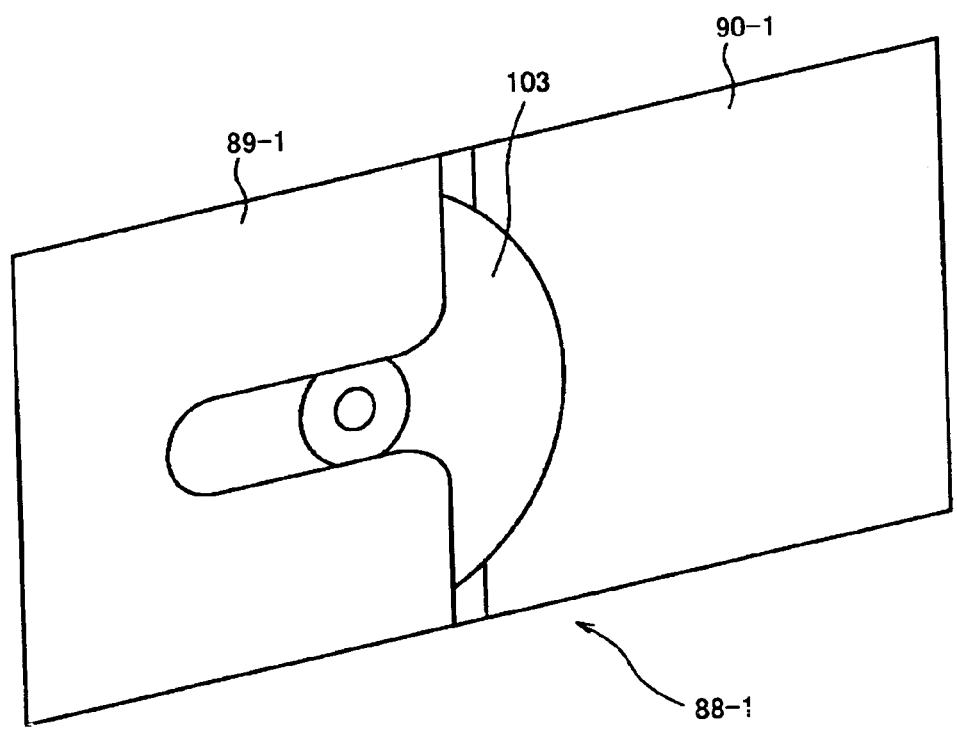
FIG. 15 is a diagram showing another configuration for accommodating the optical disk medium being the disk type, according the embodiment of the present invention.

In FIG. 15, as a first variation of the storage member 88, a storage member 88-1 is made from a paper and is formed to be an envelope. After the optical disk medium 103 is accommodated in a storage part 89-1, a cover part 90-1 is bent to cover the optical disk medium 103, so that dust does not enter the storage member 88-1.

Figure 16A:
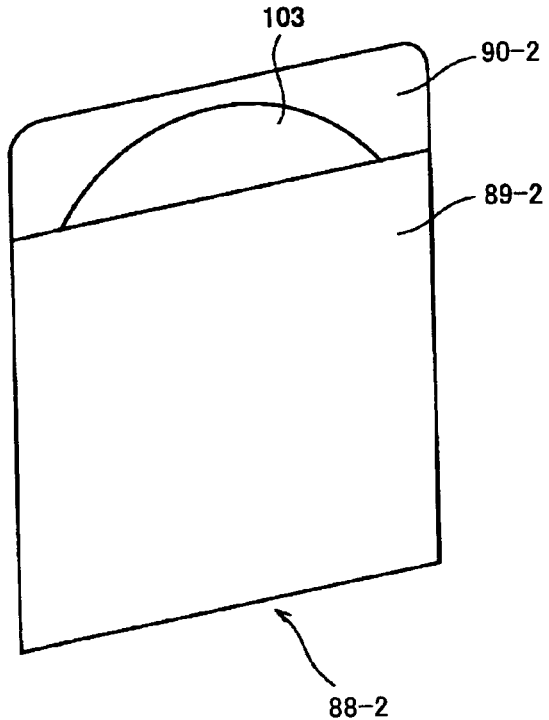
FIG. 16A and FIG. 16B are diagrams showing still another configuration for accommodating the optical disk medium being the disk type, according the embodiment of the present invention.
Figure 16B:
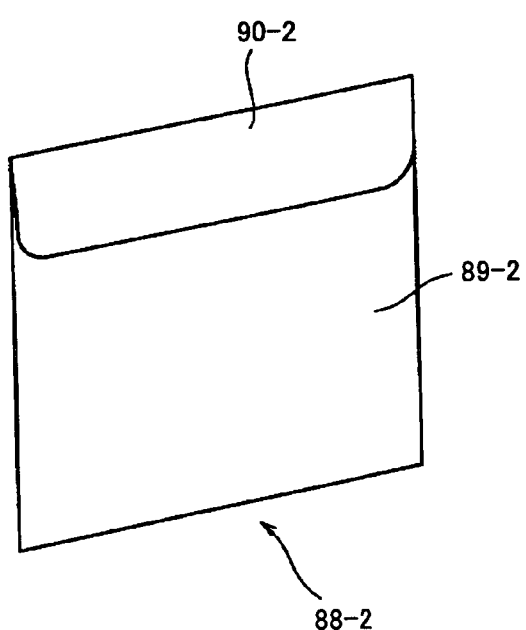
Figure 17:
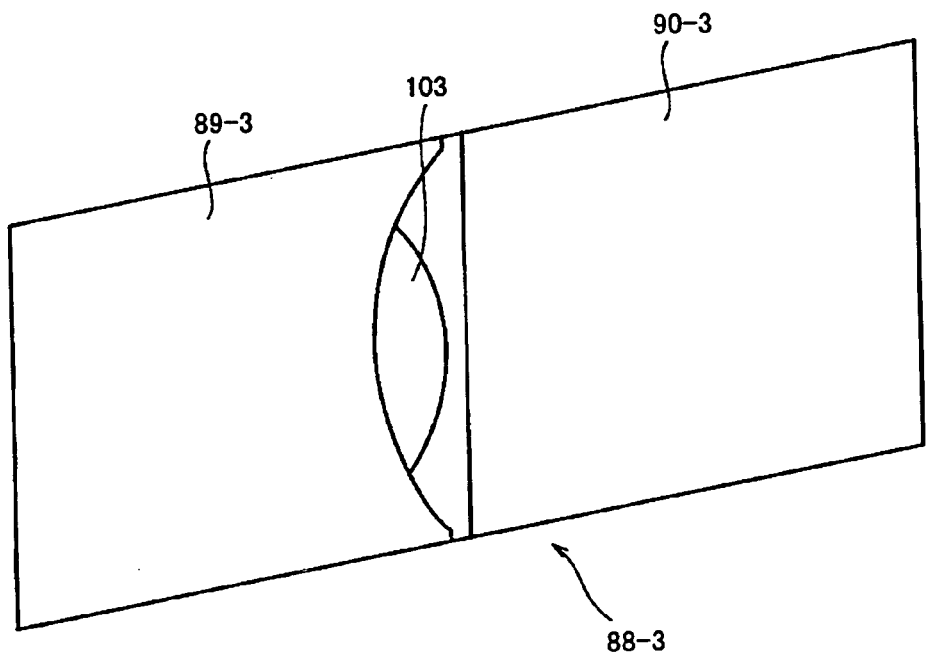
FIG. 17 is a diagram showing a further configuration for accommodating the optical disk medium being the disk type, according the embodiment of the present invention.

FIG. 16A and FIG. 16B are diagrams showing a second variation of the storage member 88. In FIG. 16A and FIG. 16B, a storage member 88-2 is a shape slightly different from the storage member 88 but has the same accommodating structure as the storage member 88. The storage member 88-2 is made from paper or vinyl. After the optical disk medium 103 is accommodated in a storage part 89-2 of the storage member 88-2 (FIG. 16A), a cover part 90-2 is bent and covers the optical disk medium 103, so that dust does not enter the storage member 88-2. FIG. 17 is a diagram showing a third variation of the storage member 88. In FIG. 17, similar to the second variation, a storage member 88-3 is a shape slightly different from the storage member 88 but has the same accommodating structure as the storage member 88. The storage member 88-3 is made from paper or vinyl. After the optical disk medium 103 is accommodated in a storage part 89-3 of the storage member 88-3, a cover part 90-3 is bent and cover the optical disk medium 103, so that dust does not enter the storage member 88-3.

Figure 18:
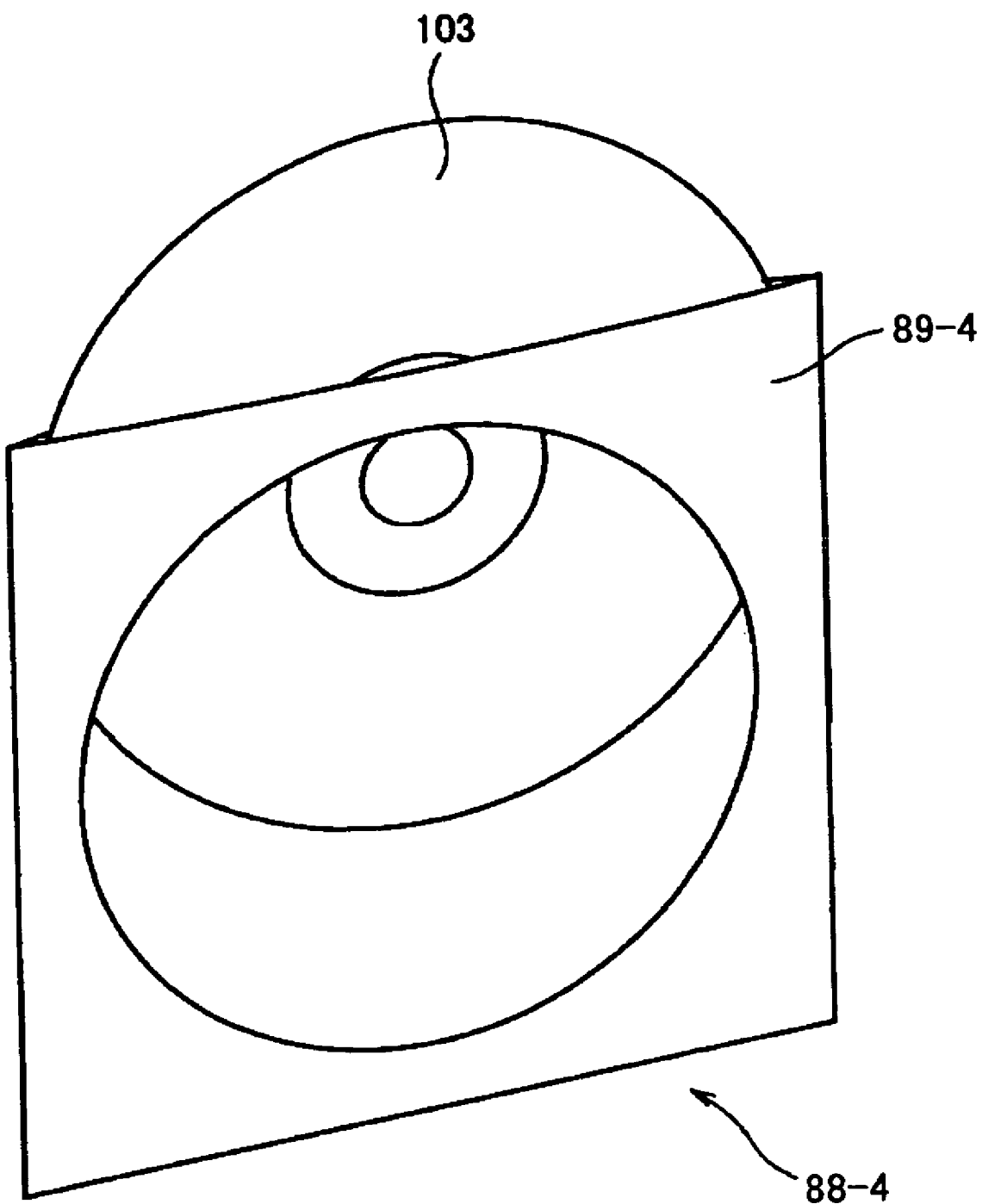
FIG. 18 is a diagram showing a still further configuration for accommodating the optical disk medium being the disk type, according the embodiment of the present invention.
Figure 19:
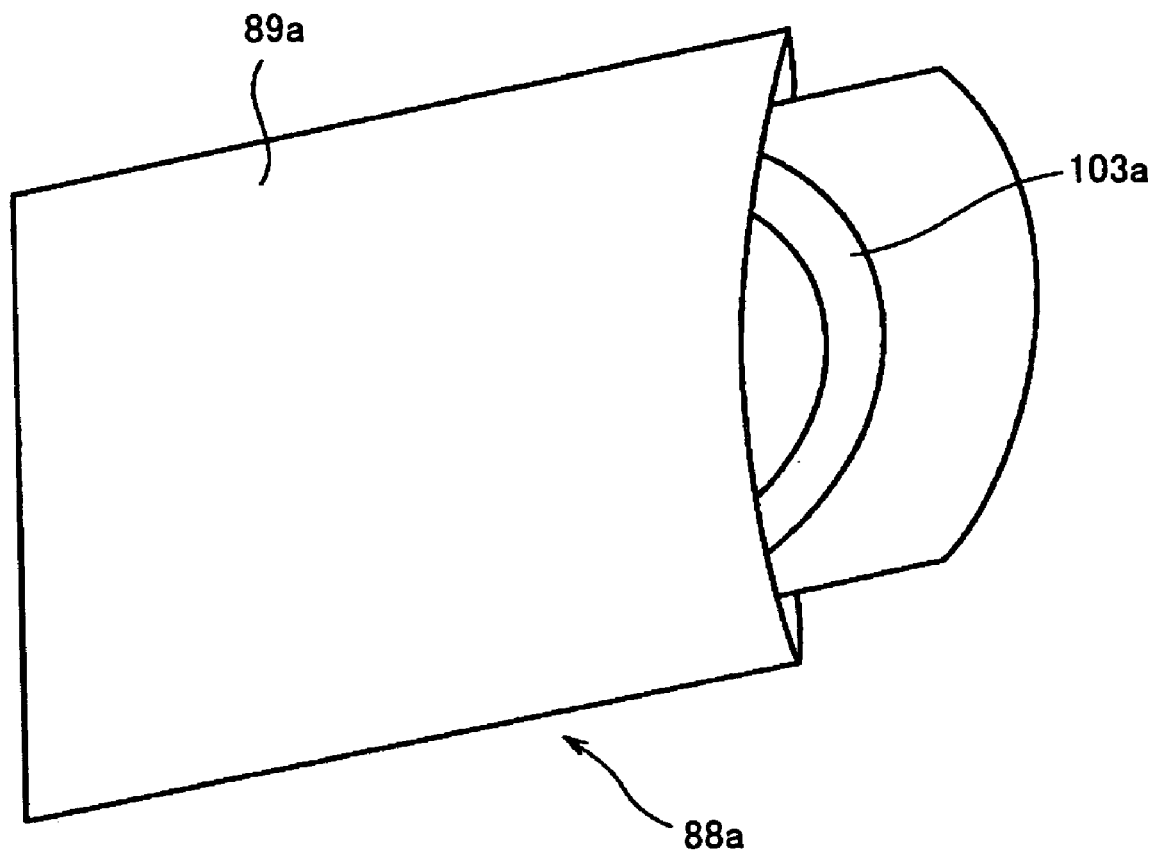
FIG. 19 is a diagram showing a configuration for accommodating an optical disk medium being a pseudo-card type, according the embodiment of the present invention.

FIG. 18 is a diagram showing a fourth variation of the storage member. A storage member 88-4 shown in FIG. 18 has an envelope shape, and a hole smaller than an outer shape of the optical disk medium 103 is formed at a center of a storage part 89-4 of the storage member 88-4. Accordingly, the optical disk medium 103 is easily accommodated in and taken out from the storage member 88-4

Figure 20A:
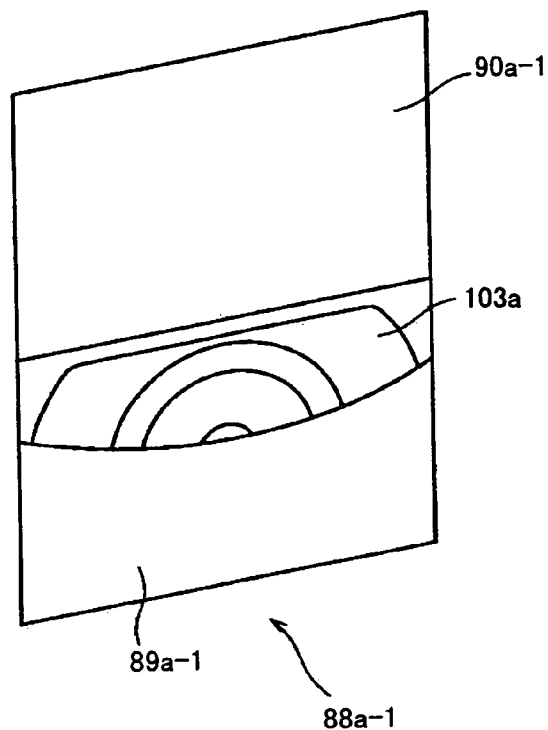
FIG. 20A and FIG. 20B are diagrams showing another configuration for accommodating the optical disk medium being the pseudo-card type, according the embodiment of the present invention.
Figure 20B:
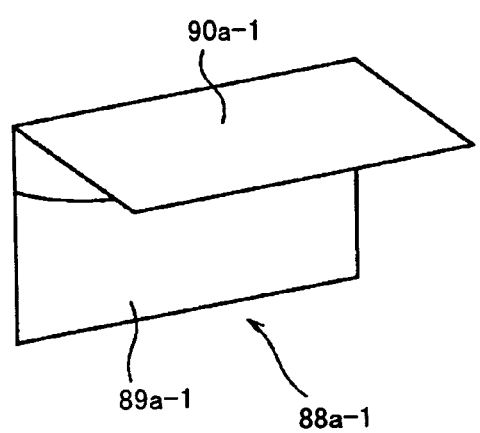
Figure 21:
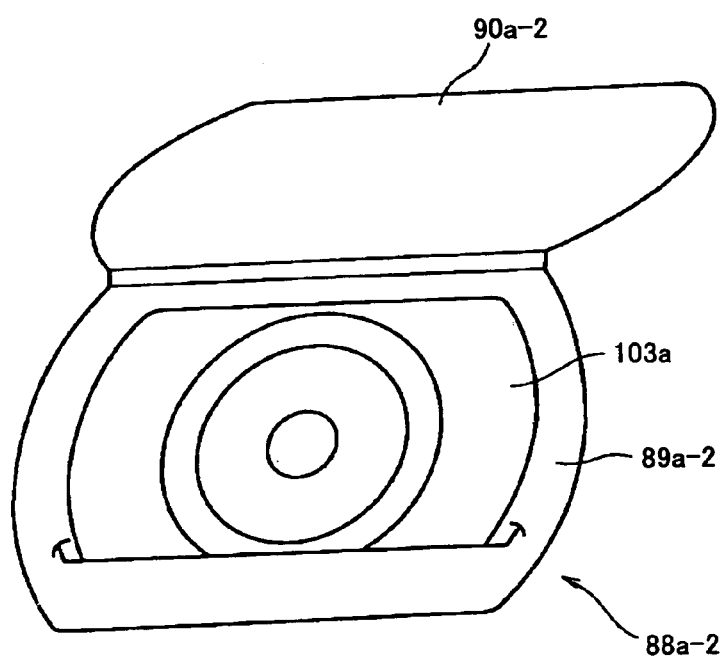
FIG. 21 is a diagram showing still another configuration for accommodating the optical disk medium being the pseudo-card type, according the embodiment of the present invention.

FIG. 19, FIG. 20A and FIG. 20B, and FIG. 21 are diagrams showing other variations of the storage member 88. In FIG. 19, FIG. 20A and FIG. 20B, and FIG. 21, an optical disk medium 103*a* has a shape similar to an oval shape in which both sides of the disk are cut off. An accommodating principle for the optical disk medium 103*a* is similar to the accommodating principle of the optical disk medium having the disk-shape. Storage members 88*a*, 88*a*-1, and 88*a*-2 have an envelope shape. If necessary, the storage members 88*a*-1 and 88*a*-2 have cover parts 90*a*-1 and 90*a*-2. The optical disk medium 103*a* is accommodated in storage parts 89*a*, 89*a*-1, and 89*a*-2. FIG. 20A shows a state in which the cover part 90*a*-1 is opened, and FIG. 20B shows a state in which the cover part 90*a*-1 is semi-closed.

In the above, various accommodation examples are described for the optical disk media 103 and 103*a* according to the present invention. As shown in FIG. 14, a plurality of the storage members 88 for accommodating the optical disk media 103 are stocked in the stock part 87 of the storage members. If necessary, the storage member 88 is taken out from the stock part 87, and the optical disk medium 103 is accommodated in the storage member 88 after data are written to the optical disk medium 103. Thus, the optical disk medium 103 can be safely taken out.

Similar to a relationship between the stock quantities of the sheet-shaped members and the portable recording media, the stock quantity of the sheet-shaped members is greater than the stock quantity of the storage members. Accordingly, it is possible to reduce a significant increase of a supply frequency caused by an extreme difference between consumption amounts of the sheet-shaped members and the storage members.

In a case of taking out the storage member 88 from the stock part 87, each optical disk medium 103 to which data are written may be manually accommodated in the storage member 88 with respect to one or two optical disk media 103. However, in a case of accommodating a greater numbers of the optical disk media 103 after the data are written, it is preferable to be automated.

In the present invention, a function for packaging the portable recording medium to which desired information is written is also included in various functions of the MFP.

FIG. 22A through FIG. 22F show diagrams showing a concept of an accommodating (packaging) process for accommodating (packaging) a portable recording medium 205. The portable recording medium 205 can be an optical disk medium of a card type, a semiconductor non-volatile memory of the card type, or a like.

Figure 22B:
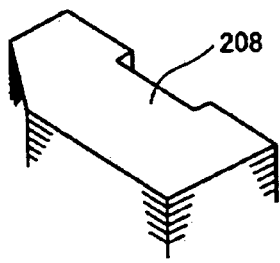
FIG. 22A through FIG. 22F are diagrams for explaining a concept of an accommodating (packaging) process of a portable recording medium being a card type, according the embodiment of the present invention.
Figure 22C:
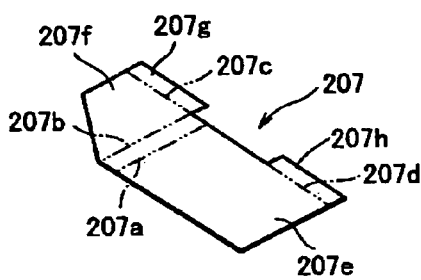
Figure 22A:
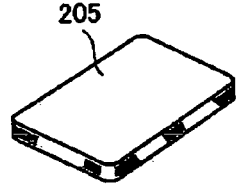

The portable recording medium 205 to which the desired information is written (FIG. 22A) is clasped by a storage member 207. A base material 208 is prepared by cutting a cardboard, a resin sheet, or a like into a rectangular shape partially having cut-offs (FIG. 22B). The storage member 207 is formed by temporarily folding so as to make temporary folding lines 207a through 207d (FIG. 22C).

Figure 22E:
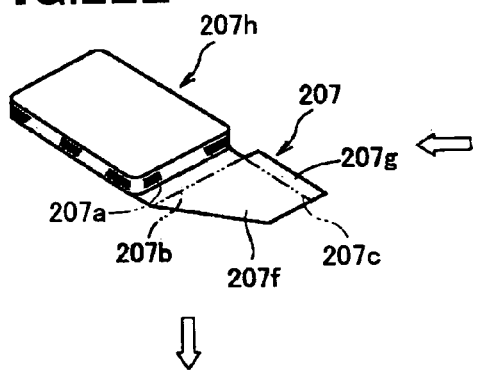
Figure 22D:
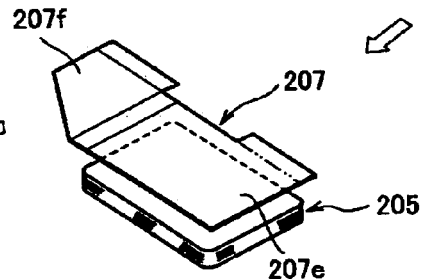
Figure 22F:
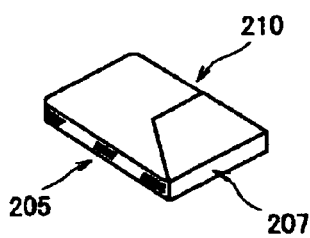

A bottom protection surface 207e has a larger surface area in the storage member 207. The bottom protection surface 207e is put on the portable recording medium 205 (FIG. 22D). The portable recording medium 205 and the storage member 207 are flipped over together (FIG. 22E). A top protection surface 207f of the storage member 207 is folded along the temporal folding lines 207a, 207b, and 207d so as to enwrap the portable recording medium 205. Thus, two flaps 207g and 207h are folded so as to protect a side of the portable recording medium 205. Accordingly, a packaged portable recording medium 210 is finished after packaging (FIG. 22F).

Figure 23:
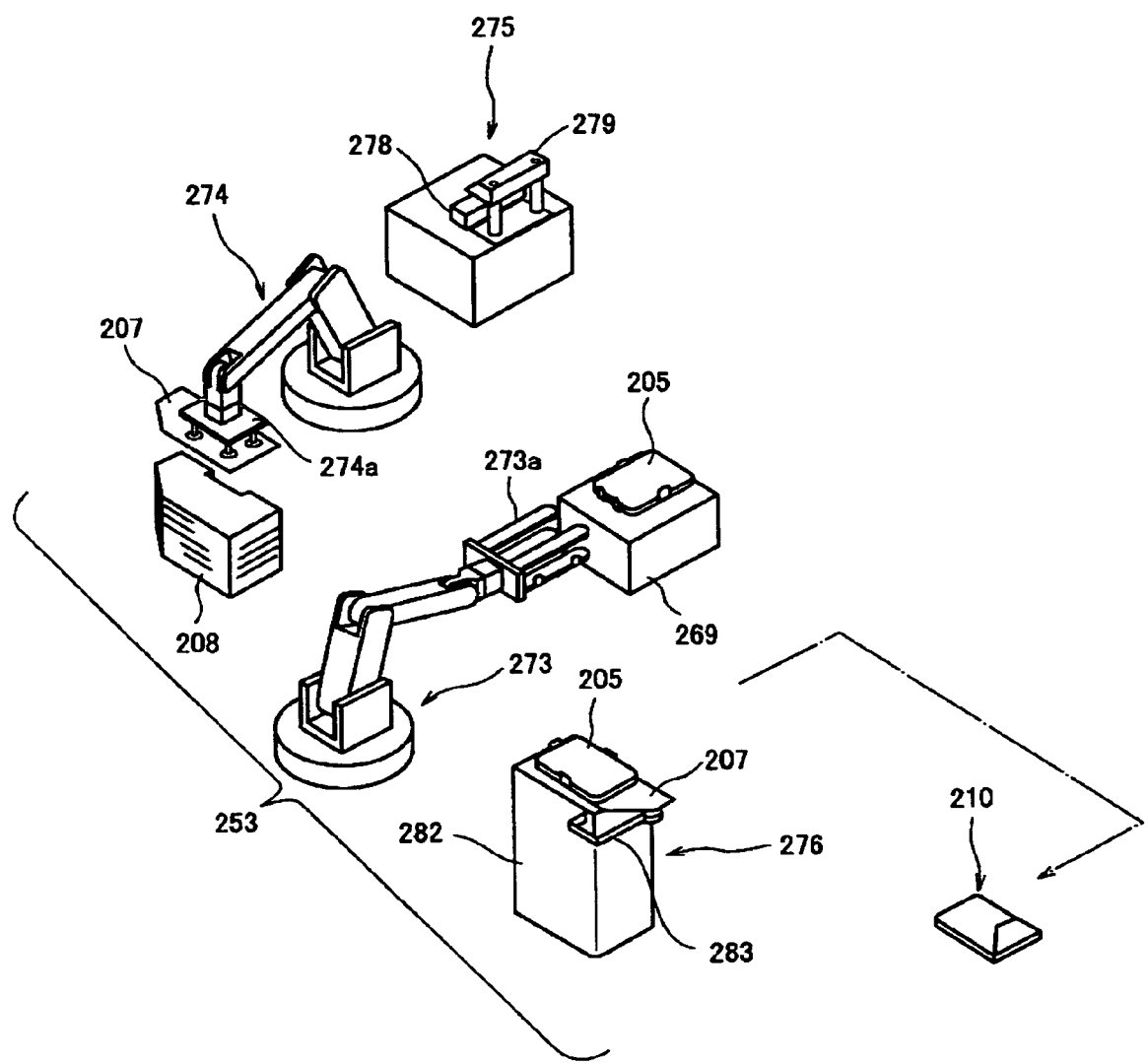
FIG. 23 is a diagram showing an example of a mechanism for conducting the accommodating (packaging) process of the portable recording medium being the card type, which is arranged in the MFP, according the embodiment of the present invention.

In the above, the accommodating (packaging) process, which is implemented as one of functions of the MFP according to the present invention, is described. In the following, an example of a mechanism for conducting the accommodating (packaging) process will be described with reference to FIG. 23.

The portable recording medium 205 to which the desired information is written is conveyed and mounted on an integration table 269. A packaging mechanism 253 includes a robot arm unit 273 for removing the portable recording medium 205 from the integration table 269, a storage member handling unit 274 for holding the storage member 207, a temporarily folding unit for temporarily folding the storage member 207, and a folding unit 276 for folding the storage member 207 so as to clasp the portable recording medium 205.

The robot arm unit 273 and the storage member handling unit 274 are general-purpose multi-shaft robot mechanism having a poly-articular arm. At a front end of the robot arm unit 273, a robot hand 273a is arranged to clasp the portable recording medium 205 and the storage member 207. At a front end of the storage member handling unit 274, a suction pad 274a is arranged to suck and hold the storage member 207.

The robot arm unit 273 and the storage member handling unit 274 put the portable recording media 205 being conveyed, on the bottom protection surface 207e of the storage member 207, and carry the portable recording media 205 placed on the bottom protection surface 207e to the folding unit 276.

The temporary folding unit 275 includes a fixing jig 278, a moving jig 279 moving downward so as to overlay to an end surface of the fixing jig 278, and a actuation mechanism (not shown) for actuating the moving jig 279 up and down. The temporary folding unit 275 folds the storage member 207 at temporary folding lines 207a through 207d.

The folding unit 276 includes a base table 282 being a box shape and mounted in a state of placing the portable recording medium 205 on the storage member 207, a folding arm part 283 for folding the top protection surface 207f of the storage member 207 onto the portable recording medium 205, and a turning mechanism for turning the folding arm part 283. As shown in FIG. 22E, the top protection surface 207f of the storage member 207 is placed on the portable recording medium 205 and folded along the temporary folding lines 207a through 207d. Two flaps 207g and 207h are folded so as to protect the side of the portable recording medium 205. As shown in FIG. 22F, After the portable recording medium 205 is packaged, the packaged portable recording medium 210 is completed.

Since the storage member 207 is described above as an example of a paper package, a plurality of base materials 208 are prepared. Alternatively, a plurality of finished storage members may be prepared (stocked) beforehand. In particular, in a case of a plastic case as shown in FIG. 14, a plurality of finished cases are stocked.

Next, other features of the present invention will be described. In the present invention, as described above, data output to the paper medium is stored or recorded to the portable recording medium or storage. When seen from the outside, it is impossible to know what information is stored. Accordingly, at least, simple correspondence information is additionally provided to label the contents of the correspondence of the paper medium (printed matter) to which the information is output and the portable recording medium or storage, and the correspondence information is provided to be seen from the outside. That is, the correspondence information is provided to be seen visually, instead of using a drive device or a like to read out information stored to the portable recording medium or storage.

In the present invention, visual information is recorded on a surface of the storage member 207 of the recording medium or storage. In detail, an output means as a means for applying color materials to the paper medium is utilized.

A record by the inkjet principle is a non-contact record or direct record. A recording object is not limited to a paper and can be a solid shape to record. Accordingly, the storage members 207 for various portable recording media or storages used in the present invention can be various corresponding to shapes of the portable recording media or storages. As seen from the above explanations, information can be easily output (recorded) on a surface by conducting the non-contact record or the direct record in the inkjet principle.

In detail, the various portable recording media or storages after accommodated is conveyed to an inkjet record head part (a part of an inkjet output) by appropriately respective conveyance means. Thus, desired information can be written on a surface of the storage member 207. In this case, it is preferable to form an ink accepting layer on a surface on which an ink adheres so as to adhere the ink on the surface of the storage member 207 or obtain preferable pixels which is not blurred.

For example, when the inkjet record is conducted to a surface of a case of an optical disk such as a polycarbonate resin or a like, recorded information may come off with a hand touch since an adhesion power of the ink is weak. Also, in a case of using a paper package as the storage member 207, a preferable pixel may not be formed due to a blur of the ink.

In order to overcome the above described problems, the ink accepting layer is formed on the surface of the polycarbonate resin or on the paper surface of the package. In detail, a micro-powder layer such as calcium carbonate ($CaCO_3$) or a like is formed with a binder resin, as the ink accepting layer.

As other examples, instead of conducting the direct record to the storage member 207, a paper label or a like is provided on a surface, the correspondence information may be recorded on the paper label or the like. In this case, a recorded paper label may be separately prepared and glued onto the surface of the storage member. Alternatively, the storage member 207 on which the paper label is glued may be appropriately conveyed to the inkjet recording part, and the correspondence information may be recorded on the paper label. A label is not limited to a paper but can be a resin film. In this case, as described in the following, an ink is selected based on a material of the surface of the storage member 207. In a case in that the ink accepting layer as described above is formed on the surface of the label, even if the label is the resin film label, the correspondence information can be recorded similar to the paper.

In general, in a case of recording to the paper medium by the inkjet principle, a water ink including water as a primary component of a solvent is used as the ink. For example, in a case of conducting the direct record to the plastic such as polycarbonate or a like, unlikely that the ink is soaked into fibers of a general paper, the ink is not soaked into the plastic. Since the ink takes time to dry, a solvent base ink or an oil base ink may be used. In this case, also, the ink or the inkjet principle (the thermal inkjet method, the on-demand method using the piezo, or the like) may be appropriately selected based on a presence or absence of the ink accepting layer, whether or not the direct record is conducted to the case surface or the label, and a material (paper/resin film) of the label.

Figure 24:
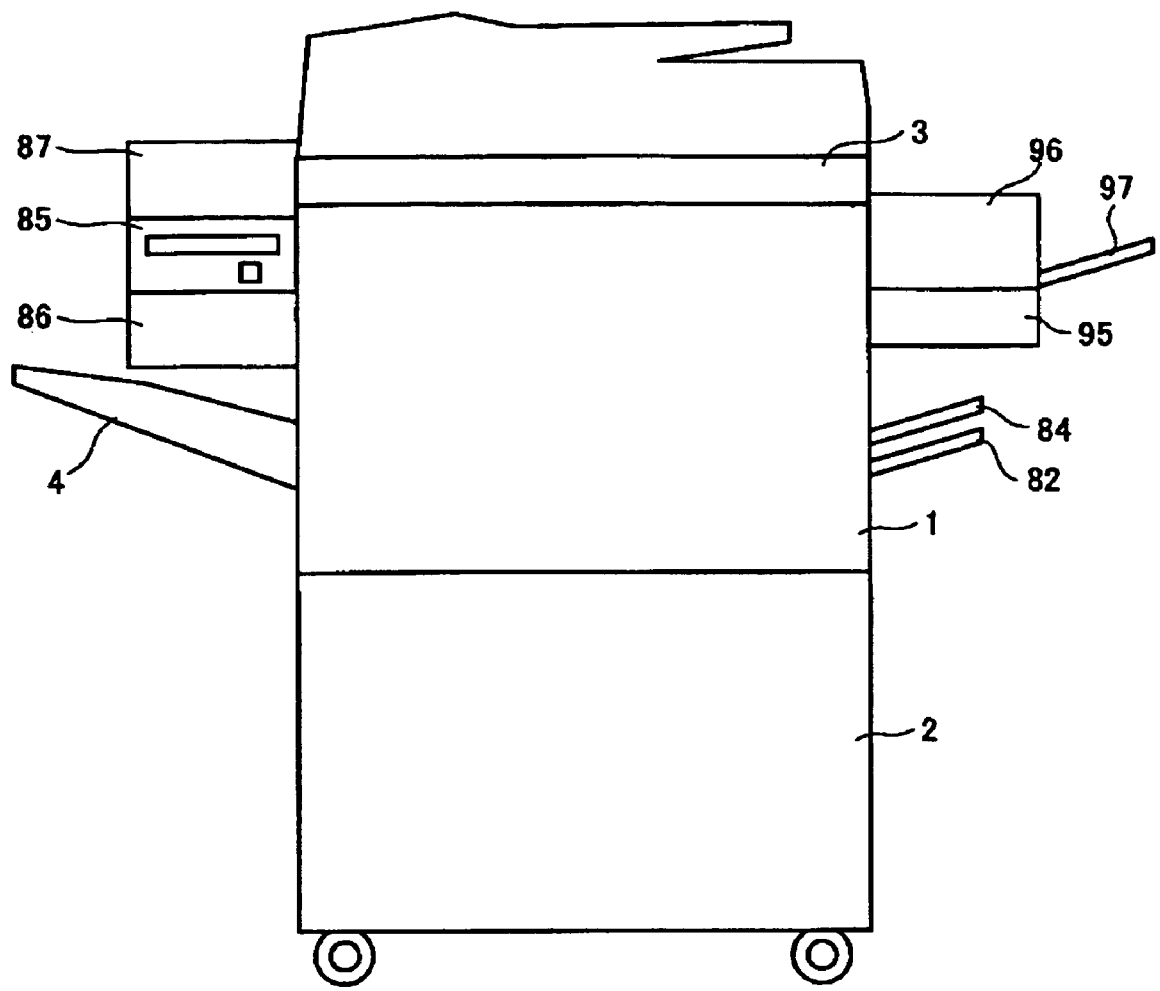
FIG. 24 is a diagram for explaining a configuration of the MFP including an inkjet recording part special to write information to a storage member by the inkjet principle, according the embodiment of the present invention.

FIG. 24 is another configuration example of the MFP according to the present invention. In FIG. 24, the MFP includes an inkjet recording part 96 which is special to write information to the storage member 207 by the inkjet principle A sheet feeding cassette 95 is used to stock a plurality of the labels special for the storage member 207 or a plurality of the storage members 207 of the portable recording medium. An inkjet recording sheet ejection tray 97 is to eject the label to which the correspondence information is written, and the storage member 207. The storage member 207 is preferably used in both states before the portable recording medium is accommodated and after the portable recording medium is accommodated inside). When concerning the state after the portable recording medium is accommodated, the storage member 207 may have a swell and may not be a flat sheet such as the paper. In a case of applying the inkjet recording part 96 for outputting the paper medium, the storage member 207 may be difficult to be conveyed.

However, as this example, by including the inkjet recording part 96 special for recording information to the storage member 207 by the inkjet principle, it is possible to avoid mixing and conveying the paper media and the storage members 207. Accordingly, since a problem such as a jam is not easily caused, this configuration example is effective.

Next, further another feature will be described. In the present invention, as described above, by the Carlson process principle, or the inkjet principle, information is output to the paper medium (print out), the information is written to the portable recording medium, and the portable recording medium is accommodated in the storage member and brought out.

Figure 25A:
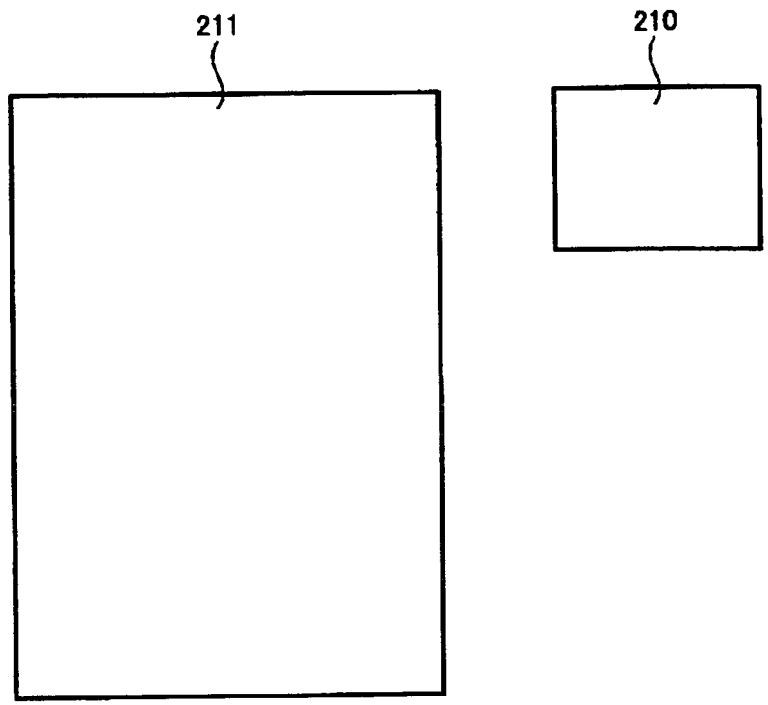
FIG. 25 is a diagram showing an example of integrating a paper document and a recording medium, according the embodiment of the present invention.
Figure 25B:
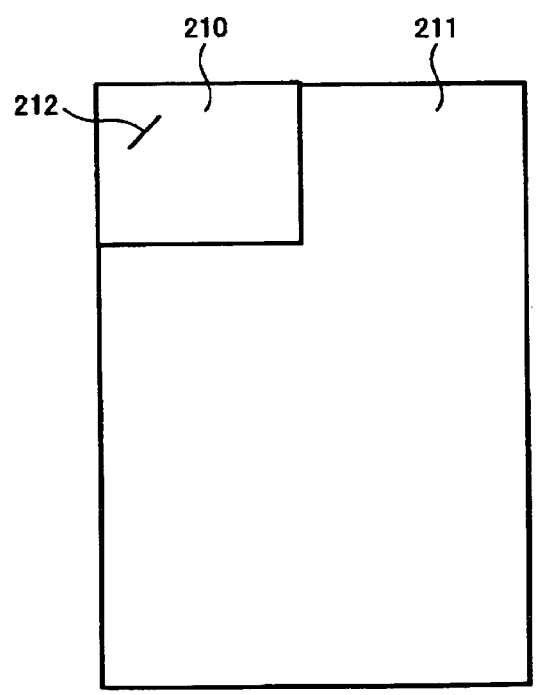

In addition to, the MFP according to the present invention includes an integration function for integrating the paper document in which the information is output to the paper media, or the sheet-shaped member such as an OHP (Over) sheet, to the portable recording medium accommodated in the storage member. FIG. 25A and FIG. 25B are a diagram for explaining an example of the integration functions.

Referring to FIG. 25A and FIG. 25B, the portable recording medium 205, to which desired information is written, is accommodated in the storage member 207 made of a paper or vinyl or a like to be the portable recording medium 210 being packaged (FIG. 25A). The portable recording medium 210 being packaged is integrated to a paper document 211 bound by a staple 212 (FIG. 25B). In this case, only one paper document and only one portable recording medium 210 may be manually integrated. In a case of integrating a plurality of paper documents and a plurality of portable recording media, according to the present invention, it is preferable for the MFP to have the integration function. In the present invention, in order to realize, the MFP has a stapling function, and can stock a plurality of staples.

A stapling operation can be used by utilizing a function of the MFP for binding a plurality of papers as a document. That is, the portable recording medium 210 being packaged with the storage member 207 is conveyed through a paper conveyance path and an ejection path for sorting a paper document by a sorter (not shown) which uniforms pages of the paper document being output. In the same manner of binding the paper document 211, the paper document 211 and the portable recording medium 210 being packaged are bound with together.

In the above, the example of binding the paper document 211 and the portable recording medium 210 being packaged by the storage member 207 with together is described. The present invention is not limited to this example. In order to integrate both the paper document and the portable recording medium 210 being packaged, for example, a double-sided tape may be used, or glue may be used. The MFP according to the present invention can always accommodate a member (the staple, the double-sided tape, the glue, or the like) for integrating both the paper document and the portable recording medium 210 being packaged, as a consumption supply. In addition to the paper document 211, any type of sheet-shaped output objects (sheet-shaped document, sheet-shaped image printed-out objects) output (printed out) by the MFP (a print-out apparatus by Carlson process principle or the inkjet principle) can be applied.

The RFID chip previously described is integrated with the sheet-shaped member or the portable recording medium. Instead, the RFID chip can be integrated to the storage member 207 described above. In addition, the portable recording medium 103 is accommodated in the storage member 88, and the RFID chip is embodied to the storage member 88. This configuration is preferable to trace information of the portable recording medium 103 and manage the portable recording medium 103 according to the present invention.

Next, further another feature of the present invention will be described. Since the information input/output apparatus according to the present invention handles papers, paper dust, toner particles, ink particles, and a like are always suspended inside or adjacent the information input/output apparatus. Accordingly, a semiconductor laser for recording to a storage such as an optical memory according to the present invention and a pickup unit (the pickup 108 in FIG. 1) formed by an optical system eventually become dirty due to the paper dust, the toner particles, the ink particles, and the like.

Moreover, different from an apparatus for writing and/or reading (outputting) information electrically such as a semiconductor non-volatile memory described as one example according to the present invention, in the storage such as the optical memory, the pickup unit and the storage are physically separated, and easily have problems (life duration of a laser diode or problem of a mechanical operation part), since an operation principle is a mechanical operation. Especially, the paper dusts, the toner, the ink, and the like being suspended may be an important factor to overcome the problems of the mechanical operation.

Accordingly, in the present invention, in order to compromise disadvantages lowering reliability by impurities, problems, and a like, the pickup is configured to be detachably connected to a drive part. Thus, when the pickup unit has a problem, the optical system such as a lens becomes dirty, and it becomes difficult to use, it is possible to easily exchange and clean the lens part.

According to the present invention, in a case in that the MFP internally mounts the storage such as the optical memory, even if there are the paper dust, the toner particles, the ink particles, and the like, and the mechanical operation part of the pickup has a problem, since the pickup unit is detachable and exchangeable, it is possible to easily recover the functions of the MFP.

According to the present invention, since the input part, the processing part, the storing part, and the output part are centralized at one place, the paper medium and the portable recording medium can be obtained at the same place. Therefore, it is possible to improve a configuration of the image forming apparatus to be a user-friendly for a user.

Furthermore, since the image information scanned by the scanner is stored in the storing part, instead of immediately output the image information, it is possible to maintain the image information inside the MFP and to retrieve the image information at any time if necessary.

Moreover, in the image forming apparatus according to the present invention, in accordance with an instruction from the information processing apparatus other than the image forming apparatus, the image information or information sent from the information processing apparatus is output. Therefore, in addition to output (print out) information to the paper medium, it is possible to output data contents to a portable recording medium other than the paper, and it is possible to maintain and move electronic data.

Moreover, since the input part, the processing part, the storing part, and the output part are centralized at one place, it is possible to obtain the paper medium and the portable recording medium, to which information is output, at the same place. Thus, it is significantly convenient for a user.

Furthermore, the image information scanned by the scanner is stored in the storing part, and also the image information can be output from the output part if necessary. Instead of immediately outputting the image information, the image information can be maintained inside the MFP, and it is possible to retrieve the image information to use at any time if necessary.

Moreover, the MFP as the image forming apparatus according to the present information connects to another information processing apparatus through the network. Information sent from the information processing apparatus is stored in the storing part of the MFP and can be output from the output part if necessary. It is possible to maintain information other than the image information scanned by the scanner. Thus, the MFP can used as a databank, a data library, and can have versatile functions to use more than a simple output apparatus.

Furthermore, any information can be output by an instruction from the information processing apparatus other than the information input/output apparatus. Therefore, it is possible to remotely operate, instead of moving to the MFP.

Moreover, in the image forming apparatus according to the present invention, the image information is compressed and stored. It is possible to reduce workload of a memory capacity. Thus, a data process operation cannot be slower.

Furthermore, the image information can be sent to another information processing apparatus. It is possible for another information processing apparatus to use the image information.

In addition, the image information can be sent to another information processing apparatus. It is possible for another information processing apparatus to effectively use the image information.

Furthermore, since a means for applying the color materials to the sheet-shaped member is the Carlson process principle, it is possible to realize a higher productivity of outputting information to the sheet-shaped member represented by the paper medium.

Moreover, since a means for applying the color materials to the sheet-shaped member is the inkjet principle, it is possible to easily realize a color output to the sheet-shaped member represented by the paper medium. In addition, it is possible to easily output a larger size sheet such as a A0 size through A2 size and a medium of a longer sheet such as a banner, and it is possible to output data contents to the portable recording medium other than the sheet-shaped member. Thus, electronic data can be stored and moved.

Furthermore, since information is recorded on a surface of the storage member by a means applying the inkjet principle, it is possible to visually realize contents and an identification of information from outside the storage member.

Moreover, since the portable recording medium is an optical memory. As a portable recording medium in a case of storing information output (printed out) and outputting (printing out) to the sheet-shaped member represented by the paper medium as electronic data, the optical memory can be significantly easily used and generally used.

Furthermore, since the optical memory is non-reverside memory, and a price of the optical memory is relatively inexpensive as one recording medium as a consumable supply. Thus, the image forming apparatus can be economically realized, and prevent information written to the optical memory from being tampered.

Moreover, the portable recording medium is a magneto-optical memory. As a portable recording medium in a case of storing information output (printed out) and outputting (printing out) to the sheet-shaped member represented by the paper medium as electronic data, the optical memory can be significantly easily used and generally used.

Furthermore, the pickup unit for writing information to the portable recording medium is detachable and exchangeable. In a case in that a life duration of the laser diode of the pickup unit is expired, only the pickup unit can be exchanged. It is possible to continue using a means (drive device) for writing desired information to the portable recording medium and the image forming apparatus itself. Thus, it is possible to realize a significantly economical image forming apparatus.

Moreover, the image forming apparatus according to the present invention uses the Carlson process principle and the inkjet principle to output to the paper. Paper dust, toner particles, ink particles, and a like are likely to be floating inside or near the image forming apparatus, and an optical system such as a lens of the pickup unit becomes easily dirty. However, in the present invention, the pickup unit is configured to be detachable and exchangeable. Thus, it is possible to easily clean up or exchange the pickup unit.

Moreover, the portable recording medium is a semiconductor nonvolatile memory. As a portable recording medium in a case of storing information output (printed out) and outputting (printing out) to the sheet-shaped member represented by the paper medium as electronic data, the optical memory can be significantly easily used and generally used.

In addition, since the portable recording medium is the semiconductor nonvolatile memory, data are not be deleted and maintained even if power is OFF. Also, the semiconductor nonvolatile memory does not have a mechanical operation part for an operation. Thus, it is possible for the image forming apparatus to realize a higher response, a higher reliability, and a significantly usefulness.

Furthermore, since the RFID chip is integrated with the sheet-shaped member beforehand, it is possible to use the RFID chip without considering where to put the RFID chip or how to integrate (attach) the RFID chip with the sheet-shaped member.

Alternatively, for an integration of the RFID chip and the portable recording medium, the RFID chip is implicitly integrated with the storage member accommodating the portable recording medium. Thus, it is not required to integrate the RFID chip with the portable recording medium itself. It is possible to include an integration step in a packaging operation. Thus, it is possible to flexibly integrate the RFID chip with the portable recording medium.

Furthermore, since the RFID chip is directly integrated with the portable recording medium or is integrated with the storage member by the thermal softening resin, it is possible to easily integrate (attach) the RFID chip to the portable recording medium.

Alternatively, since the RFID chip is directly integrated with the portable recording medium or is integrated with the storage member by the thermal hardening resin, it is possible to easily integrate (attach) the RFID chip to the portable recording medium.

Furthermore, since the RFID chip is directly integrated with the portable recording medium or is integrated with the storage member by the UV hardening resin, it is possible to easily integrate (attach) the RFID chip to the portable recording medium by illuminating a UV light and easily fixing without a contact within one second through several seconds.

Moreover, since the RFID chip is directly integrated with the portable recording medium or is integrated with the storage member by the thermal contraction resin, it is possible to easily integrate (attach) the RFID chip to the portable recording medium by simply applying hot air.

The present invention is not limited to the specifically disclosed embodiments, and variations and modifications may be made without departing from the scope of the present invention.

The present application is based on the Japanese Priority Applications No. 2005-016303 filed on Jan. 25, 2005, No. 2005-078440 filed on Mar. 18, 2005, and No. 2005-297655 filed on Oct. 12, 2005, the entire contents of which are hereby incorporated by reference.

What is claimed is:

1. An image forming apparatus, comprising:
an input part for inputting information;
a processing part for processing the information;
a storing part for storing the information;
an output part for outputting the information by applying color materials to a sheet-shaped member based on output information;
a writing part for writing the output information to a portable recording medium, the output information including an output format used to apply the color materials to the sheet-shaped member;
a scanner for scanning an original as image information, the image information being stored in the storing part;
a stocking part for stocking a plurality of sheet-shaped members and a plurality of blank portable recording media, a quantity of the sheet-shaped members being stocked more than a quantity of the portable recording media;
a plurality of providing parts for providing the blank portable recording media to the image forming apparatus, the plurality of providing parts including
a first providing part that is configured to accommodate multiple of the blank portable recording media in one magazine and provide blank portable recording medium from the magazine one by one to the writing part, the magazine being detachably connected to the image forming apparatus and including thereon an indication of a direction of mounting, and
a second providing part that is configured to manually provide blank portable recording medium to the image forming apparatus one by one such that the blank portable recording medium is conveyed to the writing part, the second providing part being separate from the first providing part;
a storage member stocking part that stores a plurality of storage members;
an accommodation part configured to package a portable recording medium, having been written on by the writing part, into a storage member, of the plurality of storage members, obtained from the storage member stocking part, the portable recording medium, having been written on by the writing part, packaged into the storage member in a state such that the portable recording medium, having been written on by the writing part, is removable from the storage member; and
an integration part configured to integrate the storage member having packaged therein the portable recording medium which has been written on by the writing part, and the sheet shaped member to which a color material is applied, the storage member having visual information relating the portable recording medium and the sheet shaped member printed thereon,
wherein the input part, the processing part, the storing part, and the output part are centralized at one place, and send and receive the information to and from each other.

2. The image forming apparatus as claimed in claim 1, wherein the image forming apparatus detects a stock amount of the sheet-shaped member and a stock amount of the blank portable recording media, and stops applying the color materials to the sheet-shaped member or writing the information to the blank portable recording medium when either one of the stock amounts becomes zero or less than a predetermined amount.

3. The image forming apparatus as claimed in claim 1, wherein a plurality of sheet-shaped members, to which the color materials are applied, are bound and integrated with a storage member packaging the portable recording medium to which output information thereof is written.

4. An image forming apparatus, comprising:
an input part for inputting information;
a processing part for processing the information;
a storing part for storing the information;
an output part for outputting the information by applying color materials to a sheet-shaped member based on output information;
a writing part for writing the output information to a portable recording medium, the output information including information relating, the sheet-shaped member, onto which the color materials are applied, and information of an output condition when printing out onto the sheet-shaped member;
a scanner for scanning an original as image information, the image information being stored in the storing part;
a stocking part for stocking a plurality of sheet-shaped members and a plurality of blank portable recording media, a quantity of the sheet-shaped members being stocked more than a quantity of the portable recording media;
a plurality of providing parts for providing the blank portable recording media to the image forming apparatus, the plurality of providing parts including
 a first providing part that is configured to accommodate multiple of the blank portable recording media in one magazine and provide blank portable recording medium from the magazine one by one to the writing part, the magazine being detachably connected to the image forming apparatus and including thereon an indication of a direction of mounting, and
 a second providing part that is configured to manually provide blank portable recording medium to the image forming apparatus one by one such that the blank portable recording medium is conveyed to the writing part, the second providing part being separate from the first providing part;
a storage member stocking part that stores a plurality of storage members;
an accommodation part configured to package a portable recording medium, having been written on by the writing part, into a storage member, of the plurality of storage members, obtained from the storage member stocking part, the portable recording medium, having been written on by the writing part, packaged into the storage member in a state such that the portable recording medium, having been written on by the writing part, is removable from the storage member; and
an integration part configured to integrate the storage member having packaged therein the portable recording medium which has been written on by the writing part, and the sheet-shaped member to which a color material is applied, the storage member having visual information relating the portable recording medium and the sheet-shaped member printed thereon,
wherein the input part, the processing part, the storing part, and the output part are centralized at one place, and send and receive the information to and from each other.

5. The image forming apparatus as claimed in claim 4, wherein the image forming apparatus detects a stock amount of the sheet-shaped member and a stock amount of the blank portable recording media, and stops applying the color materials to the sheet-shaped member or writing the information to the blank portable recording medium when either one of the stock amounts becomes zero or less than a predetermined amount.

6. The image forming apparatus as claimed in claim 4, wherein a plurality of sheet-shaped members, to which the color materials are applied, are bound and integrated with a storage member packaging the portable recording medium to which output information thereof is written.

7. The image forming apparatus as claimed in claim 4, wherein the color materials are applied to the sheet-shaped member by an electrophotography using a Carlson process.

8. The image forming apparatus as claimed in claim 4, wherein the color materials are applied to the sheet-shaped member by an inkjet technology.

9. The image forming apparatus as claimed in claim 7, wherein the information relating the portable recording medium, having been written on by the writing part, and the sheet-shaped member is recorded on a surface of the storage member.

10. The image forming apparatus as claimed in claim 9, wherein an ink accepting layer, being a micro-powder layer with a binder resin, is formed on the surface of the storage member.

11. An image forming apparatus, comprising:
an input part for inputting information;
a processing part for processing the information;
a storing part for storing the information;
an output part for outputting the information by applying color materials to a sheet-shaped member based on output information;
a writing part for writing the output information to a portable recording medium, the output information including an output format used to apply the color materials to the sheet-shaped member;
a scanner for scanning an original as image information, the image information being stored in the storing part;
a stocking part for stocking a plurality of sheet-shaped members and a plurality of blank portable recording media, a quantity of the sheet-shaped members being stocked more than a quantity of the blank portable recording media;
a plurality of providing parts for providing the blank portable recording media to the image forming apparatus, the plurality of providing parts including
 a first providing part that is configured to accommodate multiple of the blank portable recording media in one magazine and provide blank portable recording medium from the magazine one by one to the writing part, the magazine being detachably connected to the image forming apparatus and including thereon an indication of a direction of mounting, and
 a second providing part that is configured to manually provide blank portable recording medium to the image forming apparatus one by one such that the blank portable recording medium is conveyed to the writing part, the second providing part being separate from the first providing part;
a storage member stocking part that stores a plurality of storage members;
an accommodation part configured to package a portable recording medium, having been written on by the writing part, into a storage member, of the plurality of storage members, obtained from the storage member stocking part, the portable recording medium having been written on by the writing part, packaged into the storage member in a state such that the portable recording medium, having been written on by the writing part, is removable from the storage member; and
an integration part configured to integrate the storage member having packaged therein the portable recording medium which has been written on by the writing part, and the sheet shaped member to which a color material is applied, the surface of the portable recording medium having visual information relating the portable recording medium and the sheet shaped member printed thereon, wherein the input part, the processing part, the storing part, and the output part are centralized at one place, and send and receive the information to and from each other.

12. An image forming apparatus, comprising:
an input part for inputting information;
a processing part for processing the information;
a storing part for storing the information;
an output part for outputting the information by applying color materials to a sheet-shaped member based on output information;
a writing part for writing the output information to a portable recording medium, the output information including an output format used to apply the color materials to the sheet-shaped member;
a scanner for scanning an original as image information, the image information being stored in the storing part;
a stocking part for stocking a plurality of sheet-shaped members and a plurality of blank portable recording media, a quantity of the sheet-shaped members being stocked more than a quantity of the blank portable recording media;
a plurality of providing parts for providing the blank portable recording media to the image forming apparatus, the plurality of providing parts including
a first providing part that is configured to accommodate multiple of the blank portable recording media in one magazine and provide blank portable recording medium from the magazine one by one to the writing part, the magazine being detachably connected to the image forming apparatus and including thereon an indication of a direction of mounting, and
a second providing part that is configured to manually provide blank portable recording medium to the image forming apparatus one by one such that the blank portable recording medium is conveyed to the writing part, the second providing part being separate from the first providing part;
a storage member stocking part that stores a plurality of storage members;
an accommodation part configured to package a portable recording medium, having been written on by the writing part, into a storage member, of the plurality of storage members, obtained from the storage member stocking part, the portable recording medium having been written on by the writing part, packaged into the storage member in a state such that the portable recording medium, having been written on by the writing part, is removable from the storage member; and
an integration part configured to integrate the storage member having packaged therein the portable recording medium which has been written on by the writing part, and a plurality of the sheet shaped members to which a color material is applied, the storage member having visual information relating the portable recording medium and the sheet shaped members printed thereon, wherein the plurality of sheet-shaped members are bound and integrated with a storage member,
wherein the input part, the processing part, the storing part, and the output part are centralized at one place, and send and receive the information to and from each other.

* * * * *